(12) United States Patent
Talarico et al.

(10) Patent No.: US 11,469,806 B2
(45) Date of Patent: Oct. 11, 2022

(54) CSI MEASUREMENT AND FEEDBACK FOR EMTC-U SYSTEM

(71) Applicant: Apple Inc., Cupertino, CA (US)

(72) Inventors: Salvatore Talarico, Sunnyvale, CA (US); Huaning Niu, San Jose, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 666 days.

(21) Appl. No.: 16/133,208

(22) Filed: Sep. 17, 2018

(65) Prior Publication Data

US 2019/0044598 A1 Feb. 7, 2019

Related U.S. Application Data

(60) Provisional application No. 62/559,239, filed on Sep. 15, 2017, provisional application No. 62/576,524, (Continued)

(51) Int. Cl.
*H04B 1/713* (2011.01)
*H04B 7/06* (2006.01)
(Continued)

(52) U.S. Cl.
CPC .......... *H04B 7/0626* (2013.01); *H04B 1/713* (2013.01); *H04B 7/0632* (2013.01); *H04L 5/001* (2013.01);
(Continued)

(58) Field of Classification Search
CPC .... H04B 1/713; H04B 7/0626; H04B 7/0632; H04L 27/0006; H04L 5/001;
(Continued)

(56) References Cited

U.S. PATENT DOCUMENTS

| 2002/0186749 A1* | 12/2002 | Jones | H04B 1/715 375/132 |
| 2009/0060010 A1* | 3/2009 | Maheshwari | H04L 1/1671 375/211 |

(Continued)

FOREIGN PATENT DOCUMENTS

WO    WO-2011020439 A1 *   2/2011   ............ H04W 28/16

OTHER PUBLICATIONS

United States Patent Office—U.S. Appl. No. 62/559,239, filed Sep. 15, 2017, 40 pages.

*Primary Examiner* — Melvin C Marcelo
*Assistant Examiner* — Natali Pascual Peguero
(74) *Attorney, Agent, or Firm* — Sterne, Kessler, Goldstein & Fox P.L.L.C.

(57) ABSTRACT

Techniques described herein can facilitate Channel-State Information (CSI) measurement and feedback for communication in unlicensed spectrum or Sounding Reference Signal (SRS) transmission and/or channel-state estimation for communication in unlicensed spectrum. In an example, an apparatus is configured to be employed in a User Equipment (UE), and the apparatus comprises a Radio Frequency (RF) circuitry interface and processing circuitry configured to perform CSI measurement for communication in unlicensed spectrum. The apparatus further generates data for feedback according to the CSI measurement, and sends the data for feedback to RF circuitry via the RF circuitry interface. In an example, a frame structure of a data channel begins with a downlink (DL) transmission or soon after an initial signal. In an example, the CSI measurement includes measuring Channel Quality Information (CQI) for one or more sub-bands.

18 Claims, 9 Drawing Sheets

Related U.S. Application Data filed on Oct. 24, 2017, provisional application No. 62/584,633, filed on Nov. 10, 2017, provisional application No. 62/595,888, filed on Dec. 7, 2017.

(51) Int. Cl.

| | |
|---|---|
| *H04L 25/02* | (2006.01) |
| *H04L 5/00* | (2006.01) |
| *H04W 24/10* | (2009.01) |
| *H04L 27/00* | (2006.01) |
| *H04W 16/14* | (2009.01) |
| *H04W 4/70* | (2018.01) |
| *H04W 76/27* | (2018.01) |
| *H04W 74/08* | (2009.01) |

(52) U.S. Cl.
CPC .......... *H04L 5/0012* (2013.01); *H04L 5/0048* (2013.01); *H04L 5/0051* (2013.01); *H04L 5/0057* (2013.01); *H04L 27/0006* (2013.01); *H04W 16/14* (2013.01); *H04W 24/10* (2013.01); *H04L 25/0228* (2013.01); *H04W 4/70* (2018.02); *H04W 74/0808* (2013.01); *H04W 76/27* (2018.02)

(58) Field of Classification Search
CPC ... H04L 5/0012; H04L 5/0048; H04L 5/0051; H04L 5/0057; H04L 25/0228; H04W 16/14; H04W 24/10; H04W 4/70; H04W 74/0808; H04W 76/27
USPC .......................................................... 370/329
See application file for complete search history.

(56) References Cited

U.S. PATENT DOCUMENTS

| | | | |
|---|---|---|---|
| 2010/0208606 A1* | 8/2010 | Hoshino | H04L 1/0029 370/252 |
| 2011/0216682 A1* | 9/2011 | Xu | H04L 1/0027 370/311 |
| 2013/0148566 A1* | 6/2013 | Doppler | H04W 76/40 370/312 |
| 2016/0127952 A1* | 5/2016 | You | H04W 28/20 370/252 |
| 2017/0142694 A1* | 5/2017 | Yerramalli | H04W 16/14 |
| 2018/0212698 A1* | 7/2018 | Sun | H04L 5/0053 |
| 2018/0241532 A1* | 8/2018 | Kakishima | H04W 24/10 |
| 2020/0029392 A1* | 1/2020 | Ye | H04W 16/14 |

* cited by examiner

CSI MEASUREMENT AND FEEDBACK FOR EMTC-U SYSTEM

REFERENCE TO RELATED APPLICATIONS

This application claims the benefit of U.S. Provisional Application No. 62/559,239 filed Sep. 15, 2017, entitled "CHANNEL STATE INFORMATION MEASUREMENT AND FEEDBACK FOR ENHANCED MACHINE-TYPE COMMUNICATIONS IN UNLICENSED MEDIUM", U.S. Provisional Application No. 62/576,524 filed Oct. 24, 2017, entitled "SOUNDING REFERENCE SIGNAL (SRS) TRANSMISSIONS AND CHANNEL-STATE ESTIMATE FOR ENHANCED MACHINE TYPE COMMUNICATION SYSTEMS OPERATION IN UNLICENSED SPECTRUM (EMTC-U)", U.S. Provisional Application No. 62/584,633 filed Nov. 10, 2017, entitled "CHANNEL STATE INFORMATION MEASUREMENT AND FEEDBACK FOR ENHANCED MACHINE-TYPE COMMUNICATIONS IN UNLICENSED MEDIUM", and U.S. Provisional Application No. 62/595,888 filed Dec. 7, 2017, entitled "CHANNEL STATE INFORMATION MEASUREMENT AND FEEDBACK FOR ENHANCED MACHINE-TYPE COMMUNICATIONS IN UNLICENSED MEDIUM", the contents of which are herein incorporated by reference in their entirety.

FIELD

The present disclosure relates to the field of wireless communications, and more specifically, to Channel State Information (CSI) measurement and feedback for communication in unlicensed spectrum or to Sounding Reference Signal (SRS) transmission and/or channel-state estimation for communication in unlicensed spectrum.

BACKGROUND

Internet of Things (IoT) is envisioned as a significantly important technology component, which has huge potential, and may change our daily life entirely by enabling connectivity between tons of devices. IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT, User Equipments (UEs) may be deployed in huge numbers, lowering the cost of these UEs is a key enabler for implementation of IoT. Also, low power consumption is desirable to extend the life time of the battery. In addition, there are substantial use cases of devices deployed deep inside buildings, in which coverage enhancement is desired in comparison to the defined LTE cell coverage footprint. In summary, eMTC, and NB-IoT techniques are designed to ensure that the UEs have low cost, low power consumption, and enhanced coverage.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of examples and not by way of limitation in the figures of the accompanying drawings.

DETAILED DESCRIPTION

Figure 1:
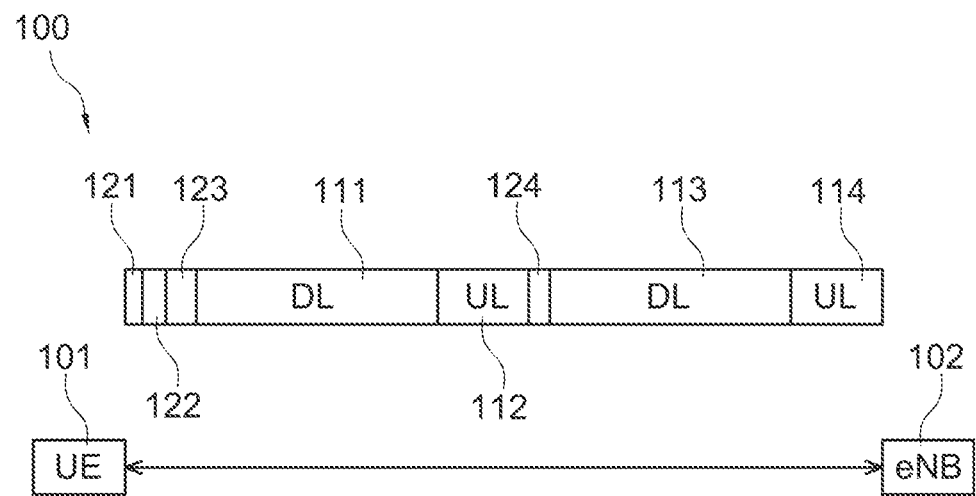
FIG. 1 illustrates an exemplary frame structure in accordance with some embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In an aspect, embodiments of the present disclosure are related to Long Term Evolution (LTE) operation in unlicensed spectrum in MulteFire, specifically the Internet of Things (IoT) operating in unlicensed spectrum. In an aspect, embodiments of the present disclosure are related to communication in unlicensed spectrum, more specifically, enhanced Machine Type Communication (eMTC) in unlicensed spectrum. In an aspect, embodiments of the present disclosure are related to CSI measurement and feedback for communication in unlicensed spectrum. In an aspect, embodiments of the present disclosure are related to the SRS transmission and/or channel-state estimation for communication in unlicensed spectrum.

Both release (Rel)-13 eMTC and NB-IoT operates in licensed spectrum. On the other hand, the scarcity of licensed spectrum in low frequency band results in a deficit in the data rate boost. Thus, there are emerging interests in the operation of LTE systems in unlicensed spectrum.

Potential LTE operation in unlicensed spectrum includes, but is not limited to the Carrier Aggregation based on Licensed Assisted Access (LAA)/enhanced LAA (eLAA) systems, LTE operation in the unlicensed spectrum via Dual Connectivity (DC), and the standalone LTE system in the unlicensed spectrum, where LTE-based technology solely operates in unlicensed spectrum without requiring an "anchor" in licensed spectrum—called MulteFire.

To extend the benefits of LTE IoT designs into unlicensed spectrum, MulteFire 1.1 is expected to specify the design for Unlicensed-IoT (U-IoT). The embodiments herein as discussed with respect to U-IoT systems, with focus on the eMTC based U-IoT design. Note that similar approaches can be used to NB-IoT based U-IoT design as well, and the embodiments herein may be applicable to other systems, such as fifth generation (5G) New Radio (NR) systems.

The unlicensed frequency band of interest for various embodiments is the 2.4 GHz band. For global availability, the design should abide by the regulations in different regions, e.g., the regulations given by FCC in US and the regulations given by ETSI in Europe. Based on these regulations, frequency hopping is more appropriate than other forms of modulations, due to more relaxed Power Spectrum Density (PSD) limitation and co-existence with other unlicensed band technology such as Bluetooth and WiFi. Specifically, frequency hopping has no PSD limit while other wide band modulations have PSD limit of 10 dBm/MHz in regulations given by ETSI. The low PSD limit would result in limited coverage. Embodiments herein include U-IoT with frequency hopping.

Since in unlicensed eMTC (eMTC-U) (i.e., eMTC in unlicensed spectrum) the data channel hops from one channel to another, and the hopping sequence depends on whether or not the carrier sensing procedure succeeds over the available channels, the CSI measurement and feedback between downlink (DL) and uplink (UL) represents an issue, and the LTE-legacy methodology cannot be reused as is. Therefore, embodiments herein include mechanisms to efficiently perform CSI measurement and feedback in eMTC-U systems.

In LTE, support for downlink channel-dependent scheduling includes the Channel-State Information (CSI), which is provided by the UEs to the network and contains information about the current channel conditions. The exact content of the CSI report depends on both the reporting mode the UE is configured to be in, and the Transmission Mode (TM 1-10). Cell-specific Reference-Signals (CRS) are used to acquire CSI in TM 1-8, while CSI Reference Signals (CSI-RS) are intended to be used by the UEs to acquire CSI in TM 9 and 10. In LTE there are two types of CSI report: aperiodic, where the reports are transmitted on the Physical Uplink Shared Channel (PUSCH) upon request by the network, and periodic, where the reports are transmitted periodically on the Physical Uplink Control Channel (PUCCH), and are generally quite long implying that the information in a report may not be possible to be transmitted in a single sub-frame.

In legacy LTE, the aperiodic reporting supports three modes:
  a. The wideband reports are short reports, which reflect the average channel quality across the entire cell bandwidth with a single Channel Quality Information (CQI) value, while the Precoder Matrix Indicator (PMI) reporting might be frequency selective.
  b. For the UE-selected reports the UE provides in addition to a wideband CQI value as the wideband report, another value which reflects the best M sub-bands over which the BW is divided into. This type of report thus provides frequency-domain information about the channel conditions.
  c. For the configured reports the UE reports one wideband CQI reflecting the channel quality across the full downlink carrier bandwidth and one CQI per sub-band, over which the BW is divided into. Similarly to the UE-selected reports, depending on the sub-mode configured, the PMI and Rank Indicator (RI) are also provided as part of this type of report.

As for periodic reporting, LTE legacy supports two modes:
  a. The wideband reports, which works in the same manner as for aperiodic report;
  b. For the UE-selected reports, the total bandwidth is divided into four bandwidth parts. The wideband CQI and PMI (if enabled) are reported together with a cyclic info of the best-band and CQI for that band.

As for legacy eMTC, only the following transmission modes are supported: TM1, TM2, TM6 (for CRS-based transmission schemes), and TM9 (for DM-RS-based transmission schemes). Furthermore, in order to simplify the CSI measurements and feedback, PMI/RI report is not applicable to TM9 (no support for x-1 and x-2 reporting mode). In legacy eMTC, CSI measurement and feedback is only supported in CE mode A. In CE mode A, the following reporting mode are supported:
  For aperiodic reports only mode 2-0 is supported for all transmission modes available. For periodic reports mode 1-0 is supported for TM1, TM2 and TM9 and mode 1-1 is supported for TM 6 and TM 9.

In eMTC, both sub-band and wideband CSI are supported, where the sub-band CQI size is 6 Physical Resource Blocks (PRBs). In both legacy LTE and eMTC, since the transmissions are performed over the same licensed band, the evaluation of the CQI is performed by estimating the channel quality through the downlink CRS or CSI-RS (SCI-RS), which are transmitted in the previous DL transmissions.

In eMTC-U, one of the main constraint for the CSI measurement and feedback is that the data channel hops from one channel to another, and furthermore the transmission on a specific data channel relies on the success of the carrier sensing procedure over that channel. This means that the measurement done over a channel are not valid on another, and if the Clear Channel Assignment (CCA) fails over a specific channel the system may hop over that channel after a minimum time of 1.2 s (15×80 ms), which makes the measurement and eventually the feedback reported on that channel outdated. For this reason, a different data frame structure and the modality for the measurement and feedback of the CSI report may be introduced for the unlicensed eMTC in embodiments of the present disclosure.

In an embodiment, the frame structure of the data channel begins with a downlink transmission, or soon after an initial signal, which is used for reliable presence detection of the data channel on which the system has hopped to. This is done to feed CSI measurements (e.g., CQI) to the UEs over that specific channel.

An exemplary frame structure 100 according to some embodiments is illustrated in FIG. 1. In an embodiment, an UE 101 (e.g., the UE 1001 or 1002 discussed in accordance with FIG. 10, which will be discussed later) and an evolved NodeB (eNB) 102 (e.g., the node 1011 or 1012 discussed in accordance with FIG. 10, which will be discussed later) may communicate over the frame structure 100. In an embodiment, under this scheduled report modality, the frame structure 100 is composed by a sequence DL-UL-DL-UL. In this case, the uplink transmission cannot be fully used for CSI feedback, since the eNB 102 is to first grant request for CSI through the uplink grant scheduling, such that the report sent from the UE 101 and/or other UEs may not be wasted. This implies some processing and scheduling delays, which preclude some subframes (SFs) to be used. In an embodiment, additional CCA overhead is introduced, since the channel sensing is to be performed again after the first UL transmission.

According to some embodiments, the frame structure 100 includes DL SFs 111, UL SFs 112, DL SFs 113 and UL SFs 114. Furthermore, the frame structure 100 may include a frequency tuning period 121, a CCA and enhanced CCA (eCCA) period 122, a presence signal period 123 and a CCA and eCCA period 124. As illustrated in FIG. 1, the sequence of the frame structure 100 may be in the sequence of the frequency tuning period 121, the CCA and eCCA period 122, the presence signal period 123, DL SFs 111, the UL SFs 112, the CCA and eCCA period 124, DL SFs 113 and UL SFs 114. In an embodiment, the dwelling time of the frame structure 100 may be several tens of milliseconds. In an embodiment, the dwelling time of the frame structure 100 may be approximately 75 milliseconds.

Figure 2:
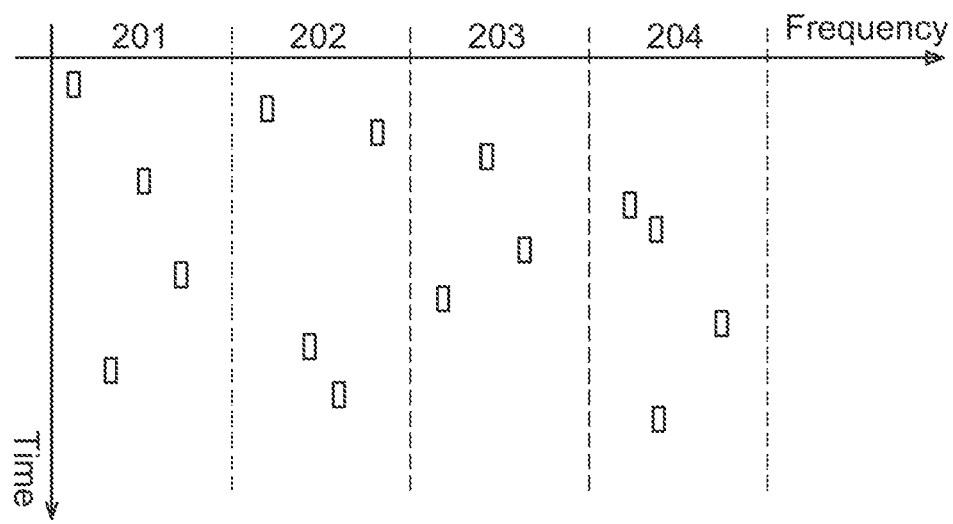
FIG. 2 illustrates an example of bandwidth partition over four sub-bands in accordance with some embodiments of the present disclosure.

In an embodiment, the total band over which the system hops in is divided over multiple sub-bands. In an embodiment, the CQI is measured over each single sub-band, and the number of sub-bands, in which the total band is divided, and this defines the granularity of the CQI measurement (with maximum granularity being the hopping channel). An example of bandwidth partition over four sub-bands is illustrated in FIG. 2 with a granularity of four sub-bands. As illustrated in FIG. 2, the CQI for four sub-bands (i.e., CQI 201, CQI 202, CQI 203 and CQI 204) are measured. In an embodiment, the CQI for all sub-bands is periodically transmitted. In other embodiments, only the CQI related to a specific sub-band is transmitted.

The number of sub-bands, may be fixed or predefined, or it may be flexibly changed through higher layer signaling. Alternatively, the bandwidth of sub-band is configured by the eNB 102 or pre-defined.

Figure 3:
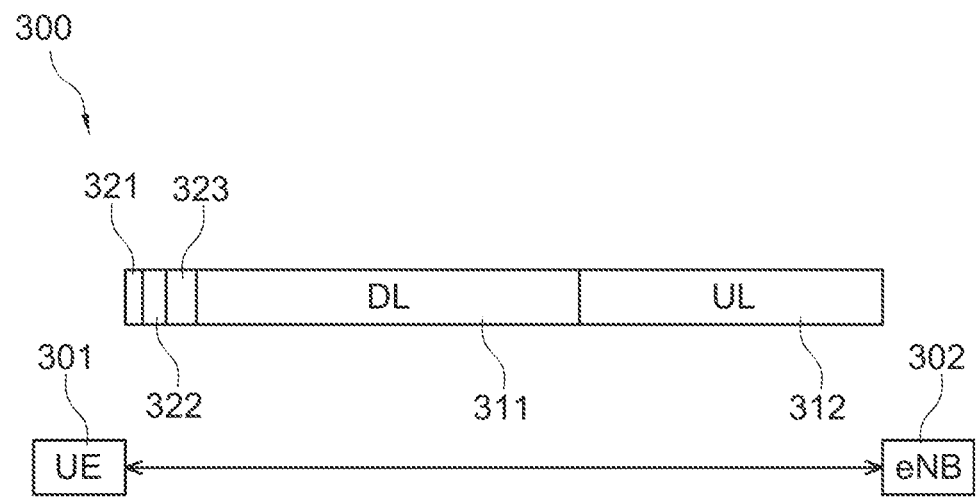
FIG. 3 illustrates an exemplary frame structure in accordance with some embodiments of the present disclosure.

An exemplary frame structure 300 according to some embodiments is illustrated in FIG. 3. In an embodiment, an UE 301 (e.g., the UE 1001 or 1002 discussed in accordance with FIG. 10, which will be discussed later) and an eNB 302 (e.g., the node 1011 or 1012 discussed in accordance with FIG. 10, which will be discussed later) may communicate over the frame structure 300. In an embodiment, the UE 301 performs long term measurement of the CQI on a specific sub-band based on continue DL transmissions over that sub-band. In an embodiment, the UE 301 provides periodic feedback as for LTE legacy reporting mode 1-0, where the periodicity may be configured through RRC or Downlink Control Information (DCI) signaling. In an embodiment, periodic reporting mode 3-0 or 3-1 may be reused. In an embodiment, periodic mode 2-0 and/or 2-1 may be used where the M sub-bands are selected based on a whitelist.

According to some embodiments, the frame structure 300 is a DL-UL frame structure including DL SFs 311 and UL SFs 312. Furthermore, the frame structure 300 may include a frequency tuning period 321, a CCA and eCCA period 322 and a presence signal period 323. As illustrated in FIG. 3, the sequence of the frame structure 300 may be in the sequence of the frequency tuning period 321, the CCA and eCCA period 322, the presence signal period 323, DL SFs 311 and the UL SFs 312. In an embodiment, the dwelling time of the frame structure 300 may be several tens of milliseconds. In an embodiment, the dwelling time of the frame structure 300 may be approximately 75 milliseconds.

In an embodiment, the hopping sequence is still generated in a pseudo random manner in order to comply with the regulation, but an additional constraint is added to limit the separation in frequency among two adjacent channels. This is done with the aim to guarantee that the channels used by two consequent frequency hops are sufficiently close. In an embodiment, the generation of the sequence is done such a way that next hop is correlated with the previously hop, and a new hop is limited to a certain range of values based upon the previous hop (limiting the maximum distance from it). In an embodiment, if such approach is adopted, a frame structure with sequence DL-UL (e.g., the frame structure 300) may be used, and the CQI report may be computed based on the measurement of the previous DL transmission occurred over the adjacent channel in the previous hop. In an embodiment, the CQI report may be done in a periodic manner following LTE legacy mode 1-0. In other embodiments, when choosing the active channels, the eNB 102 or 302 may try to choose the channel having high correlation.

In an embodiment, the Rank Indicator (RI) is not reported, and the rank is fixed to 1. In an embodiment, only CQI is reported and mode x-2 and x-3 are not supported.

In an embodiment, one or two extra bits may be added in the related DCI to indicate if at a given time one or the others is used.

In an embodiment, a periodic reporting is performed. In an embodiment, the CQI report may be done as a wideband CQI. In an embodiment, as a complement or in alternative, the UE 101 or 301 selects preferred channel indexes, or Resource Blocks (RBs). In an embodiment, as a complement or in alternative, the total bandwidth is divided into sub-bands, and the sub-band CQI may be 2 bit differential field based on wideband CQI.

In an embodiment, as legacy eMTC only mode 1-0 and 1-1 are supported, where the latest contains a wideband CQI (4 bits long) and a wideband PMI (2 bits). In an embodiment, for wideband CQI, this may be computed as follows:
1. the total bandwidth constructed by the channels in a whitelist;
2. the total bandwidth of multiple adjacent channels, e.g., channels in a whitelist ranging from $f_C-f_{BW}$ to $f_C+f_{BW}$, where $2*f_{BW}$ is the coherent bandwidth. This may be configured by the eNB 102 or 302 or it may be pre-defined; and
3. the total bandwidth of a specific channel.

In an embodiment, frequency-selective CQI is supported. For instance, mode 2-0 or 3-0 is supported in conjunction with other modalities, e.g., mode 1-0 and/or mode 1-1. In an embodiment, the CQI is evaluated according to the UE 101 or 301 preferred channel index, or RBs. In this case, the index may be:
1. The channel index within a whitelist; and
2. The index of N contiguous RBs within one specific channel, e.g., N=2 or 3.

In an embodiment, for sub-band CQI, this may be evaluated as follows:
1. the CQI based on one specific channel; and
2. the CQI on selected RBs within one specific channel.

In an embodiment, mode 1-0 and 1-1 are supported, and each CQI and PMI is evaluated for each sub-band, as indicated above. In order to be able to fit the information related to the CQI and PMI for all the sub-bands, in which the total bandwidth is divided into, within the PUCCH (format 3) payload (21 bits total), one the two following options may be used:
1. The number of sub-bands is limited by the available bits within the PUCCH (format 3) payload that may be used for reporting CQI and PMI. The HARQ process IDs may be also properly fit within the PUCCH format 3, in order to reduce the payload.
2. In each PUCCH transmission, the PMI and CQI report information of only one sub-band at the time is included, which resembles what is done over PUCCH for feedback mode 2-0 in LTE-legacy. In other words, the reports for all the sub-bands are not sent together at the same time, but are spread over several reporting opportunities. In an embodiment, an offset between reports and an equation that indicates their periodic occurrence may be introduced, and it depends on the frame structure type over which the PUCCH transmission is performed.

In an embodiment, mode 2-1 and/or 3-1 is also supported.

In an embodiment, a scheduled CQI report transmission is supported, and aperiodic reporting is performed. In an embodiment, the CQI report may be done as a wideband CQI. In an embodiment, as a complement or in alternative, the UE 101 or 301 selects preferred channel indexes, or RBs. In an embodiment, as a complement or in alternative, the total bandwidth is divided into sub-bands, and the sub-band CQI may be 2 bit differential field based on wideband CQI.

In an embodiment, only mode 1-0 may be supported. In an embodiment, for wideband CQI, this may be computed as follows:
1. the total bandwidth constructed by the channels in a whitelist;
2. the total bandwidth of multiple adjacent channels, e.g., channels in a whitelist ranging from $f_C - f_{BW}$ to $f_C + f_{BW}$, where $2*f_{BW}$ is the coherent bandwidth. This may be configured by the eNB 102 or 302 or it may be pre-defined;
3. the total bandwidth of a specific channel.

In an embodiment, only mode 1-1 is supported, which includes a wideband CQI, and a single PMI on this wideband CQI. In alternative, mode 1-1 is supported with other reporting modalities.

In an embodiment, only mode 2-0 is supported as the legacy eMTC systems or in conjunction with other modalities, e.g., mode 1-0 and/or mode 1-1. In an embodiment, the CQI is evaluated according to the UE 101 or 301 preferred channel index, or RBs. In this case, the index may be:
1. The channel index within a whitelist;
2. The index of N contiguous RBs within one specific channel, e.g., N=2 or 3.

In an embodiment, for sub-band CQI, this may be evaluated as follows:
1. The CQI based on one specific channel;
2. The CQI on selected RBs within one specific channel.

In an embodiment, similarly to legacy eMTC reporting mode 2-0, the following are included in the report:
1. the CQI/PMI evaluated per each sub-band;
2. CQI evaluated over a continuous set of RBs (i.e., one narrowband). In this last case, the CQI report may contain either the measurement over the current dwell or the measurement over the best narrow band. In an embodiment, this choice may be indicated through a bit field within the DCI.

In an embodiment, mode 2-1 is also supported.

In an embodiment, an offset may be contained within the DCI that triggers the CQI measurement:
1 bit: "0" to indicate that the previous (or next) channel is to be used for CQI measurement; "1" to indicate that the current channel where the DCI is transmitted is to be used for CQI measurement. In alternative, "0" is used to indicate the previous (or next) channel, where DCI is transmitted, and "1" to indicate the next hopping channel.
2 bits: "00" to indicate that the previous channel is to be used for CQI measurement; "01" to indicate that the current channel, where the DCI is transmitted, is to be used for CQI measurement; "10" to indicate that the next channel is to be used for CQI measurement; and "11" is reserved.

More than 2 bits are used to indicate the channel index that is used for CQI measurement.

In an embodiment, the total band over which the system hops in is divided over multiple sub-bands as shown in FIG. 2, and described above. In one embodiment, the number of sub-bands may be explicitly set among a specific set of values (i.e., {1,2,3,4}) through RRC signaling (i.e., within the "cqi-ReportConfig" field) or it may depends on the cell bandwidth. In one embodiment, the sub-band size is fixed or high layer configured. In one embodiment, the number of sub-bands is related to the bandwidth available, and is equal to the total bandwidth divided by the sub-band size. In one embodiment, the number of sub-bands is fixed, and defined in the specification, or in alternative it may be semi-statically defined. In one embodiment, the center frequency of the sub-band is fixed or RRC signaled.

In an embodiment, the number of sub-bands is encoded in the bitmap, which provides an indication of the channel list given M groups and N channels (i.e., M=4, and N=14) to use: according to the bitmap info the number of sub-bands is known. In one embodiment, the adjacency of bits is an indication on the adjacency in the spectrum of the channels to use, and based on the bit separation the number of sub-bands may be defined. In one embodiment, one bit separation is sufficient for enabling an additional sub-band. For instance, given a bitmap composed by 14 bits, the following may be concluded:
0 0 0 0 0 0 0 0 0 1 1 1 1→only one sub-band is used
0 0 0 1 1 0 0 0 0 0 0 0 1 1→two sub-bands are defined
0 0 0 0 0 0 1 0 1 0 1 0 1→four sub-bands are defined In one embodiment, two or three or more bits of separation are the minimum threshold to configure an additional sub-band. The value of the bitmap itself provides also an indication of which channel belongs to which specific sub-band, based on how the channels are spaced between each other, and/or their position in the spectrum.

In one embodiment, the number of sub-bands is implicitly indicated by the channels that are enabled by the bitmap of the channel list, and the bandwidth separation among them. Additional sub-bands may be defined each time the separation between a channel and the others within the set of enabled channels is higher than X Khz, where X may be fixed, or higher layer configured.

In one embodiment, the bitmap signals the channels to be used in such a manner that this reflects how separated they are in frequency among each other based on the decimal representation of the bitmap, which we indicate here with S. For example, the bitmap may be organized such that a sequence of adjacent channels is indicated with low vales of S, while highly separated channels are indicated with higher values of S. According to this, brackets of values may be defined, such that according to the value of S, the number of sub-bands is known. As an example, if S<=A the 1 sub-band is used, if B<=S<A 2 sub-bands are used, if C<=S<B 2 sub-bands are used, if D<=S<C 3 sub-bands are used, and if D<S 4 sub-bands are used, where A<B<C<D.

Since total number of hopping channel may be either 16 or 32, the number of hopping data channels within each sub-band may also calculated based on above embodiments.

In another embodiment, the hopping channels included in each sub-band is higher layer configured by the eNB 102 or 302. For example, in "cqi-reportConfig", the eNB 102 or 302 may explicitly configure number of sub-bands and the channels used in each sub-band using a bitmap. An example of this embodiment is provided below:

```
CQI-report-Subband-config-MF :: = SEQUENCE{
numberSub-band   INTEGER {1, ... Max}
sub-bandConfig   {
    subband1,       Bit String (size (14))    OPTIONAL - Need on
    subband2,       Bit String (size (14))    OPTIONAL - Need on
    ...
    }
}
```

In an embodiment, the eNB 102 or 302 may configure maximum X sub-bands (where X is, e.g., 4).

Since in eMTC systems operation in unlicensed spectrum the data channel hops from one channel to another, and the hopping sequence depends on whether or not the carrier sensing procedure succeeds over the available channels, the SRS transmissions between UL and DL and the consequent channel-state estimation represent an issue, and the LTE-legacy methodology cannot be reused as is. Therefore, embodiments herein provide mechanisms to efficiently perform SRS transmissions in eMTC-U systems.

Embodiments herein provide mechanisms to perform Sounding Reference Signal (SRS) transmissions in eMTC-U systems, which are characterized by frequency hopping where the hopping sequence depends on the carrier sensing procedure success that effects the channel state estimation. The embodiments may support SRS transmission for channel-state estimation by the eNB to support uplink channel-dependent scheduling and link adaptation in eMTC-U systems.

In legacy-LTE, Sounding Reference Signals (SRSs) are intended to be used by the evolved NodeB (eNB) for channel-state estimation at different frequencies to support uplink channel-dependent scheduling and link adaptation, but also in other situations when uplink transmission is desired although there is no data to transmit, such as for uplink timing estimation as part of the uplink-timing-alignment procedure. Only one symbol may be reserved for SRS, which is the last symbol within a subframe (SF), even though in Time Division Duplexing (TDD) mode SRS may also be transmitted within the Uplink Pilot Time Slot (UpPTS). Similarly to Demodulation Reference Signal (DM-RS), a SRS is defined as a frequency-domain reference-signal sequence, which is a cyclic extension of prime-length Zadoff-Chu (ZC) sequence for sequence length bigger or equal to 30 or computer-generated sequence for sequence length less than 30, and it is cell-specific (typically, UE-specific reference signal sequences are not supported for SRS). An SRS is not necessarily transmitted together with any physical channel, and it may span over a different frequency range. Two types of SRS transmissions are defined in LTE: periodic and aperiodic SRS transmission.

Periodic SRS transmission may occur at regular time intervals (from as often as every 2 ms to as infrequently as 160 ms), and may be activated/deactivated through a one bit field called "SRS request" contained in the DCI format 0/0A/0B/4/4A/4B/1A/6-0A/6-1A for FDD mode, and DCI format 2B, 2C, 2D and 3B in TDD mode. Periodic SRS transmission spans on different frequency ranges and it allows two options: i) the SRS transmission is performed over a wideband of interest; ii) the SRS transmission occurs in a more narrowband fashion that is performed through the entire band of interest through hopping in frequency domain in such a way that a sequence of SRS transmissions jointly spans the frequency range of interest. The instantaneous SRS bandwidth is a multiple of four Resource Blocks, and the lengths of the reference-signal sequences for SRS are thus multiples of 24. Another characteristic of SRS is that the reference-signal is mapped in frequency domain every N subcarriers such that it creates different combs-like structures depending on the value of N. In order to multiplex different SRS transmissions, different cyclic-shifts may be applied to generate different SRSs that are orthogonal to each other. Another way to allow for SRS to be simultaneously transmitted from different UEs is to rely on the fact that each SRS only occupies every second (or every fourth) subcarrier. Thus, SRS transmissions from two devices may be frequency multiplexed by assigning them to different frequency shifts or "combs". If a UE is transmitting SRS in a certain SF, the SRS transmission may overlap with PUSCH transmissions from other UEs within the cell. In order to avoid such collisions, UEs are aware of the set of SFs (which is provided as part of the cell system information) within which SRS is transmitted by any UE within the cell, and the UE avoid PUSCH transmission in the last Orthogonal Frequency-Division Multiplexing (OFDM) symbol of those SFs. As mentioned above, in this typology of transmission mode, many are the things that may be configured (e.g., periodicity, bandwidth, frequency hopping, comb type and number, etc.), that are here set through RRC signaling.

Aperiodic SRS transmissions are a one-shot transmission that is triggered by the "SRS request" field in the DCI form 0 used for uplink scheduling grant transmission. The SRS request field consists of two bits that are used to set one of the three preconfigured settings for the SRS transmissions (e.g., different configuration in terms of frequency position of the SRS transmission and/or the transmission comb), or dictate that no SRS should be transmitted. When such a trigger is received, a single SRS is transmitted in the next available aperiodic SRS instant configured for the UE using the configured frequency-domain parameters. Additional SRS transmissions may then be carried out if additional triggers are received. The frequency-domain structure of an aperiodic SRS transmission is identical to that of periodic SRS. Also, in the same way as for periodic SRS transmission, aperiodic SRS are transmitted within the last symbol of a subframe. Furthermore, the time instants when aperiodic SRS may be transmitted are configured per device using higher-layer signaling.

In eMTC-U, one of the main constraint for the SRS transmission is that the data channel hops from one channel to another. Furthermore, the transmission on a specific data channel relies on the success of the carrier sensing procedure over that channel. This means that the channel-state estimation done over a channel are not valid on another, and if the Clear Channel Assessment (CCA) fails over a specific channel the system will hop over that channel after a minimum time of 1.2 s (15×80 ms), which makes the estimate on that channel outdated. For this reason, the data frame structure and the modality for SRS transmission may be introduced for the eMTC-U systems in embodiments of the present disclosure.

In an embodiment, in eMTC-U, SRS signal is transmitted using 6 Resource Blocks (RBs) within a data hop. In an embodiment, the LTE-legacy structure and signal generation design may be reused. In an embodiment, the SRS signal may have a comb-like structure within the 6 RBs. In another embodiment, the SRS signal occupy all the tones across the 6 RBs, and different Cyclic Delay Diversity (CDD) or Orthogonal Cover Codes (OCCs) may be used for UE multiplexing.

In an embodiment, the SRS transmission is performed over the all 6 Physical Resource Blocks (PRBs). In an embodiment, the SRS transmission occurs in a PRB fashion that is performed through the entire 6 PRBs through hopping in frequency domain in such a way that a sequence of SRS transmissions jointly spans the frequency range of interest. In an embodiment, the SRS transmission hops may be carrier specific, not UE specific. In an embodiment, the hopping patterns follow the data hopping pattern, which is a function of Physical Cell Identity (PCI) and System Frame Number (SFN)+eFrame number.

In an embodiment, the periodic SRS transmission opportunities may be defined relative to the downlink (DL)/uplink (UL) configuration. For example, SRS transmission opportunity may be configured on the first UL SF within a data dwell. In case the DL/UL configuration changes in SIB-anchor, SRS may not be reconfigured. In an embodiment, once activated SRS transmission may not rely on DL CCA/enhanced CCA (eCCA) success or not. In an embodiment, the SRS opportunities are constrained to a specific data dwell, and even if a periodic SRS transmission is activated it is automatically disabled at the end of the available data dwell.

Figure 4:
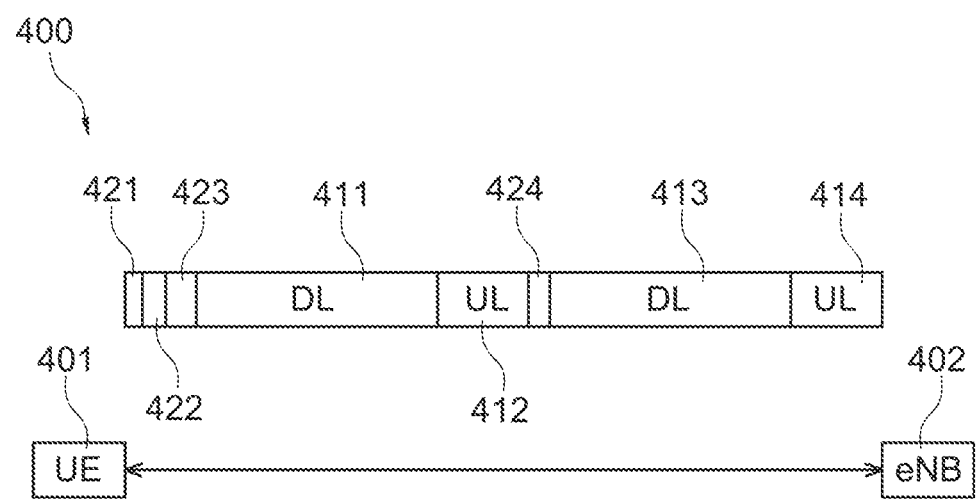
FIG. 4 illustrates an exemplary frame structure in accordance with some embodiments of the present disclosure.

An exemplary frame structure 400 according to some embodiments is illustrated in FIG. 4. In an embodiment, an UE 401 (e.g., the UE 1001 or 1002 discussed in accordance with FIG. 10, which will be discussed later) and an eNB 402 (e.g., the node 1011 or 1012 discussed in accordance with FIG. 10, which will be discussed later) may communicate over the frame structure 400. In an embodiment, the frame structure 400 of the data channel begins with a downlink transmission, or soon after an initial signal, which is used for reliable presence detection of the data channel on which the system has hopped to, and this is used to trigger periodic or aperiodic SRS transmissions within the available UL dwell time. In an embodiment, a DL-UL structure is adopted where the frame structure 400 is chosen. In this case, the uplink transmission cannot be fully used, since the eNB 402 is to first grant request for SRS transmission through the uplink grant scheduling or through DCI format 1/2A/2B/2C, such that the SRS transmission sent from the UE 401 and/or other UEs will not be wasted. This implies some processing and scheduling delays, which preclude some SFs to be used. In an embodiment, in order to extend the SRS transmissions opportunities, the frame structure comprises a sequence DL-UL-DL-UL, with the drawback that additional CCA overhead may be introduced, since the channel sensing is to be performed again after the first UL transmission.

According to some embodiments, the frame structure 400 includes DL SFs 411, UL SFs 412, DL SFs 413 and UL SFs 414. Furthermore, the frame structure 400 may include a frequency tuning period 421, a CCA and eCCA period 422, a presence signal period 423 and a CCA and eCCA period 424. As illustrated in FIG. 4, the sequence of the frame structure 400 may be in the sequence of the frequency tuning period 421, the CCA and eCCA period 422, the presence signal period 423, DL SFs 411, the UL SFs 412, the CCA and eCCA period 424, DL SFs 413 and UL SFs 414. In an embodiment, the dwelling time of the frame structure 400 may be several tens of milliseconds. In an embodiment, the dwelling time of the frame structure 400 may be approximately 75 milliseconds.

Figure 5:
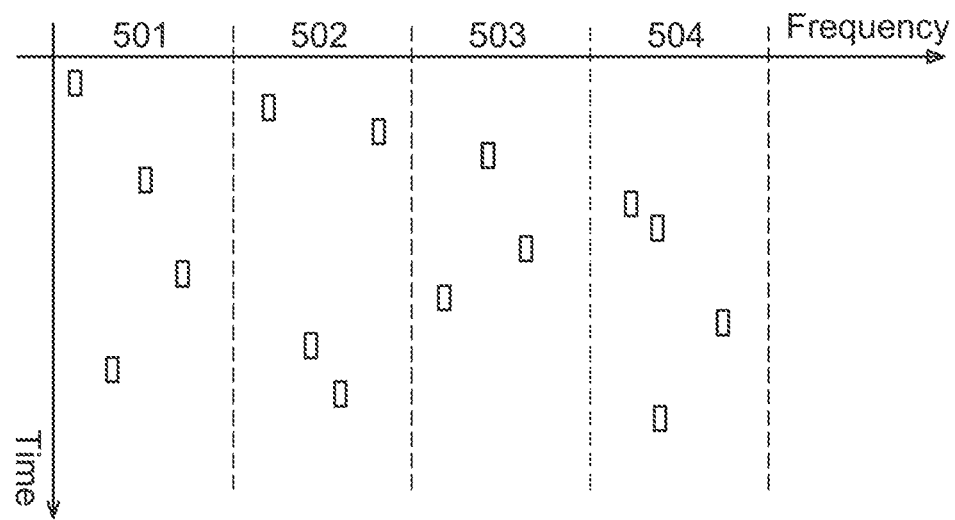
FIG. 5 illustrates an example of bandwidth partition over four sub-bands in accordance with some embodiments of the present disclosure.

In an embodiment, the total band over which the system hops in is divided over multiple sub-bands. In an embodiment, the channel state estimation is performed over each single sub-band, and the number of sub-bands, in which the total band is divided, defines the granularity of the channel state estimate (with maximum granularity being the hopping channel). An example of bandwidth partition over four sub-bands is illustrated in FIG. 5 with a granularity of four sub-bands. As illustrated in FIG. 5, the CQI for four sub-bands (i.e., CQI 501, CQI 502, CQI 503 and CQI 504) are measured. In an embodiment, the SRS transmission is performed for all sub-bands in a periodical manner. In another embodiment, SRS transmissions are performed over a specific sub-band, which may be configured through higher layer signaling. In an embodiment, the sub-bands configuration for SRS may be the same or different as that of the sub-bands configuration of CSI-RS for downlink channel measurement.

In an embodiment, the number of sub-bands, may be fixed or predefined, or it may be flexibly changed through higher layer signaling. In an embodiment, similar consideration may be made on the number of time on which SRS transmissions are performed over a specific sub-band before, and the SRS is transmitted on a different band. In an alternative embodiment, the bandwidth of sub-band is configured by the eNB 402 or pre-defined. In one embodiment, the UE 401 performs periodic transmission of SRS where the periodicity can be configured through RRC. In such one embodiment, the eNB 402 performs long term channel state estimate on a specific sub-band based on continue SRS transmissions over that sub-band. In an embodiment, the SRS transmission for a sub-band is done by the means of a sufficiently wideband SRS transmission that allows for sounding of the entire frequency range of interest with a single SRS transmission. In an embodiment, the SRS transmission occurs over the means of a more narrowband transmission that is hopping in the frequency domain in such a way that a sequence of SRS transmission jointly spans the range of interest in a long run.

In an embodiment, the hopping sequence is still generated in a pseudo random manner in order to comply with the regulation, but an additional constraint is added to limit the separation in frequency among two adjacent channels. This is done with the aim to guarantee that the channels used by two consequent frequency hops are sufficiently close. In an embodiment, the generation of the sequence is done such a way that next hop is the most correlated with the previously hop. In an embodiment, correlation and channel separation can be jointly used for the sequence. In an embodiment, a frame structure with sequence DL-UL as well as the frame structure 400 with sequence DL-UL-DL-UL may be used, and long term channel state estimate is performed upon the channel-state estimate of the previous SRS transmission occurred over the adjacent channel in the previous hop. In an embodiment, the SRS transmission can be done in a periodic manner or in an aperiodic manner.

In an alternative embodiment, there is no SRS, and the eNB 402 may estimate the channel information based on the DM-RS of PUSCH.

Figure 6:
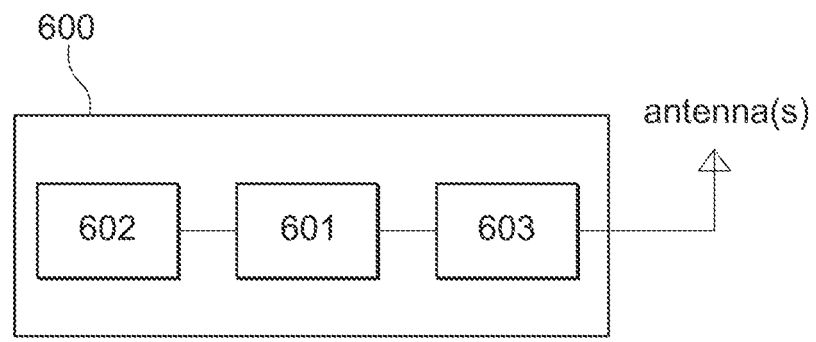
FIG. 6 illustrates an exemplary electronic apparatus or system in accordance with some embodiments of the present disclosure.

FIG. 6 illustrates an exemplary electronic apparatus or system 600 configured to be employed in a UE (e.g., the UE 1001 or 1002 discussed in accordance with FIG. 10, which will be discussed later) or an IoT device that facilitates the CSI measurement and feedback or the SRS transmission and/or channel-state estimation for communication in unlicensed spectrum (e.g., eMTC-U) according to some embodiments. In an embodiment, the electronic system 600 comprises one or more processors 601 (e.g., the one or more processors discussed in accordance with FIG. 12 and/or FIG. 13, which will be discussed later) configured to cause the UE to perform the CSI measurement and feedback for unlicensed eMTC or the SRS transmission and/or channel-state estimation for unlicensed eMTC as described above and herein. In an embodiment, the one or more processors 601 may include processing circuitry and an associated memory interface. In an embodiment, the electronic system 600 may further include a memory 602 coupled with the memory interface and communication circuitry 603 containing a transceiver or a transmitter and/or a receiver coupled to antenna(s). In an embodiment, the electronic system 600 may further include an RF circuitry interface to couple the processing circuitry to RF circuitry.

Figure 7:
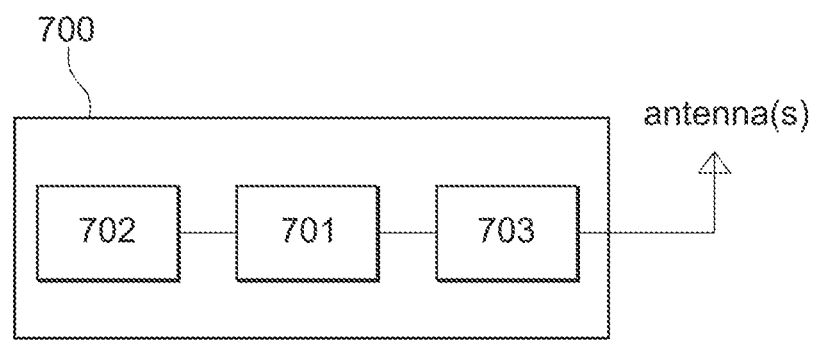
FIG. 7 illustrates an exemplary electronic apparatus or system in accordance with some embodiments of the present disclosure.

FIG. 7 illustrates an exemplary electronic apparatus or system 700 configured to be employed in an eNB (e.g., the node 1011 or 1012 discussed in accordance with FIG. 10, which will be discussed later) or IoT device that facilitates the corresponding CSI measurement and feedback or the SRS transmission and/or channel-state estimation for communication in unlicensed spectrum (e.g., eMTC-U) according to some embodiments. In an embodiment, the electronic system 700 comprises one or more processors 701 (e.g., the one or more processors discussed in accordance with FIG. 12 and/or FIG. 13, which will be discussed later) configured to facilitate the CSI measurement and feedback for unlicensed eMTC or the SRS transmission and/or channel-state estimation for unlicensed eMTC as described above and herein. In an embodiment, the one or more processors 701 may include processing circuitry and an associated memory interface. In an embodiment, the electronic system 700 may further include a memory 702 coupled with the memory interface and communication circuitry 703 containing a transceiver or a transmitter and a receiver coupled to antenna(s). In an embodiment, the electronic system 700 may further include an RF circuitry interface to couple the processing circuitry to RF circuitry.

Figure 8:
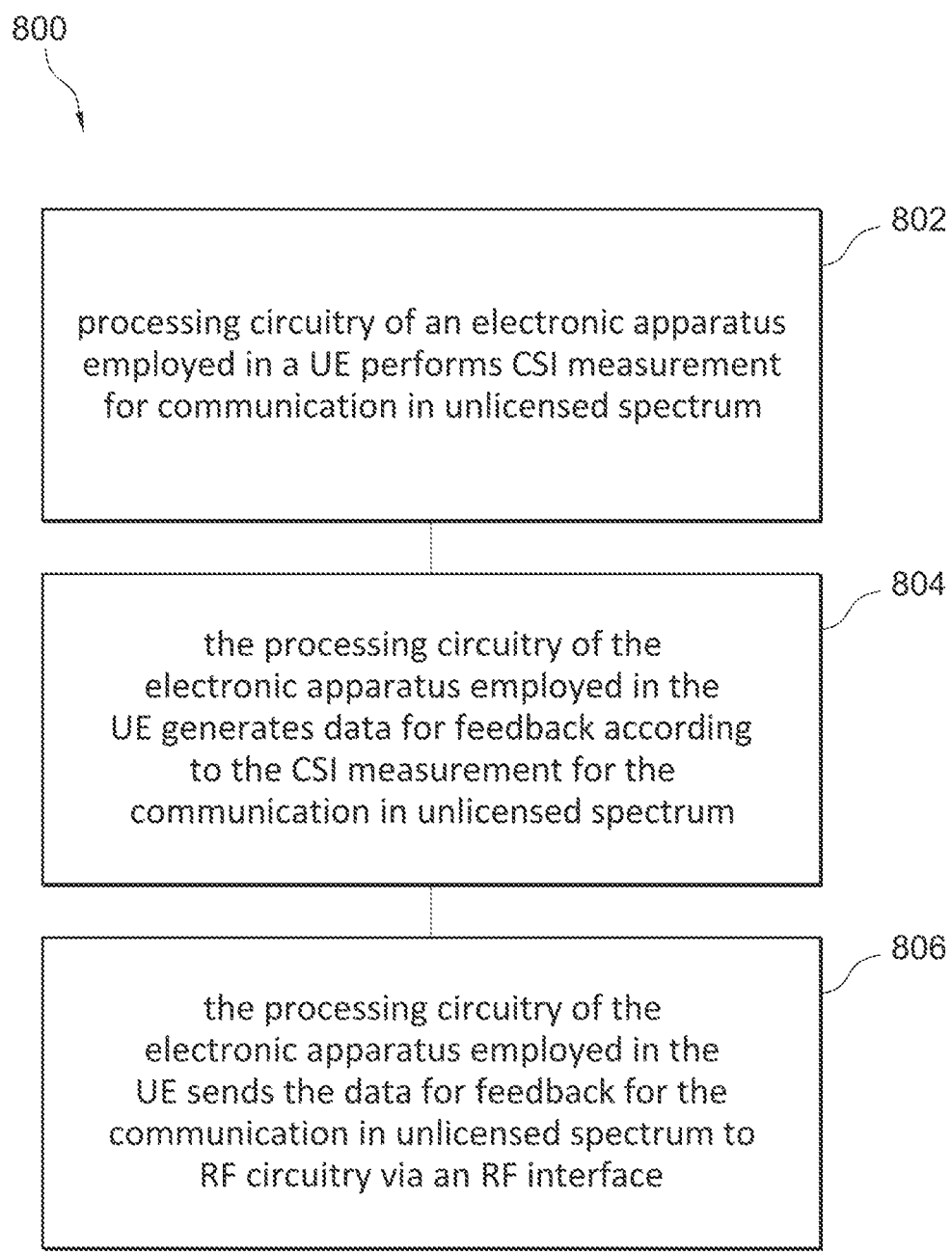
FIG. 8 is a flow chart illustrating an exemplary procedure in accordance with some embodiments of the present disclosure.

FIG. 8 is a flow chart illustrating an exemplary procedure 800 that facilitates the CSI measurement and feedback for communication in unlicensed spectrum (e.g., eMTC-U) according to some embodiments. At the operation 802, processing circuitry of an electronic apparatus employed in a UE performs CSI measurement for communication in unlicensed spectrum. In an embodiment, the CSI measurement may include measuring CQI for one or more sub-bands. In an embodiment, the CSI measurement includes measuring CQI for each sub-band. In an embodiment, the processing circuitry of an electronic apparatus employed in a UE may perform the CQI measurement by performing long term measurement of the CQI on a specific sub-band based on continuous DL transmissions over that sub-band. In an embodiment, the processing circuitry may compute the CQI as follows: a total bandwidth constructed by the channels in a whitelist, a total bandwidth of multiple adjacent channels, and a total bandwidth of a specific channel. In an embodiment, the processing circuitry may further evaluate the CQI according to a UE preferred channel index or RBs. In an embodiment, the processing circuitry may further evaluate sub-band CQI as follows: the CQI based on one specific channel and the CQI on selected RBs within one specific channel. In one embodiment, the CQI may be wideband CQI. In an embodiment, the CQI may include wideband CQI and sub-band CQI. In such one embodiment, the sub-band CQI is 2 bit differential field based on the wideband CQI.

At the operation 804, the processing circuitry of the electronic apparatus employed in the UE generates data for feedback according to the CSI measurement for the communication in unlicensed spectrum. At the operation 806, the processing circuitry of the electronic apparatus employed in the UE sends the data for feedback for the communication in unlicensed spectrum to RF circuitry via an RF circuitry interface. In an embodiment, the feedback may be transmitted by the UE (e.g., to an eNB) periodically. In another embodiment, the feedback may be transmitted by the UE (e.g., to an eNB) aperiodically. In an embodiment, a frame structure of a data channel for the communication begins with a downlink (DL) transmission or soon after an initial signal. In one embodiment, the frame structure is a DL-UL-DL-UL frame structure. In such one embodiment, the DL-UL-DL-UL frame structure includes a frequency tuning period, a CCA and eCCA period, a presence signal period, a DL subframes period, a UL subframes period, a CCA and eCCA period, a DL subframes period and a UL subframes period in sequence. In one embodiment, the frame structure is a DL-UL frame structure. In such one embodiment, the DL-UL frame structure includes a frequency tuning period, a CCA and eCCA period, a presence signal period, a DL subframes period and a UL subframes period in sequence. In an embodiment, the procedure 800 may further include an optional operation that the processing circuitry of the electronic apparatus employed in the UE generates data for a hopping sequence for the communication in a pseudo random manner, and wherein a constraint is added to limit the separation in frequency among two adjacent channels.

Figure 9:
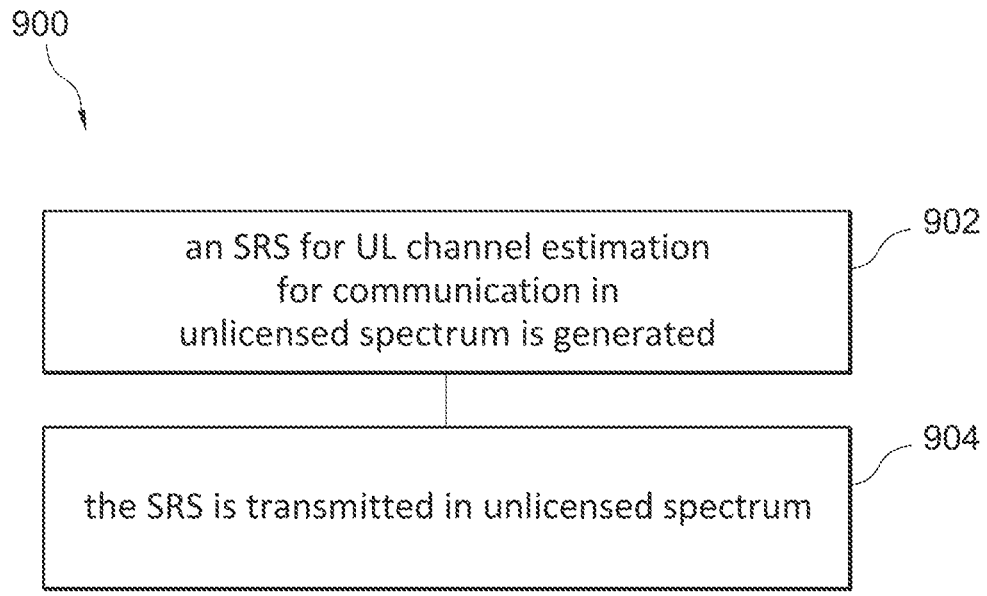
FIG. 9 is a flow chart illustrating an exemplary procedure in accordance with some embodiments of the present disclosure.

FIG. 9 is a flow chart illustrating an exemplary procedure 900 that facilitates the SRS transmission and/or channel-state estimation for communication in unlicensed spectrum (e.g., eMTC-U) according to some embodiments. At the operation 902, an SRS for UL channel estimation for communication in unlicensed spectrum is generated. In an embodiment, the communication is over a frame structure of the data dwell time comprises a DL dwell time and a UL dwell time, and a DL transmission in the DL dwell time is to trigger transmission of the SRS within an available UL dwell time. At the operation 904, the SRS is transmitted in unlicensed spectrum (e.g., from a UE to an eNB). In one embodiment, SRS transmission hops for the SRS may be generated in a carrier-specific manner. In such one embodiment, hopping patterns for the SRS transmission hops may be generated based on a data hopping pattern. In such one embodiment, the data hopping pattern may be determined based on a function of a Physical Cell Identity (PCI) and System Frame Number (SFN)+eFrame number. In an embodiment, the frame structure comprises a DL-UL sequence or a DL-UL-DL-UL sequence.

In an alternative embodiment, the procedure 900 may further include an optional operation to detect a configuration via higher layer signaling, wherein the higher layer signaling comprises RRC signaling or NAS signaling, to determine or identify, based on the configuration, a number of sub-bands and/or a number of times on which SRS transmissions are to be performed over a specific sub-band before the SRS is transmitted on a different band, and to determine or identify a bandwidth of the sub-band based on the configuration. In an alternative embodiment, the procedure 900 may further include an optional operation to generate a hopping sequence such that channels have a specific separation in frequency among two adjacent channels and/or the channels are sufficiently correlated, wherein the SRS is to be communicated on a periodic basis or on an aperiodic basis.

In some embodiments, a computer-readable medium (e.g., a non-transitory computer-readable medium) comprises instructions, when executed (e.g., by one or more processors of the exemplary electronic system 600 or 700 and/or other electronic devices), to cause an electronic device to perform the exemplary procedures 800 or 900 and/or other procedures described above.

Figure 10:
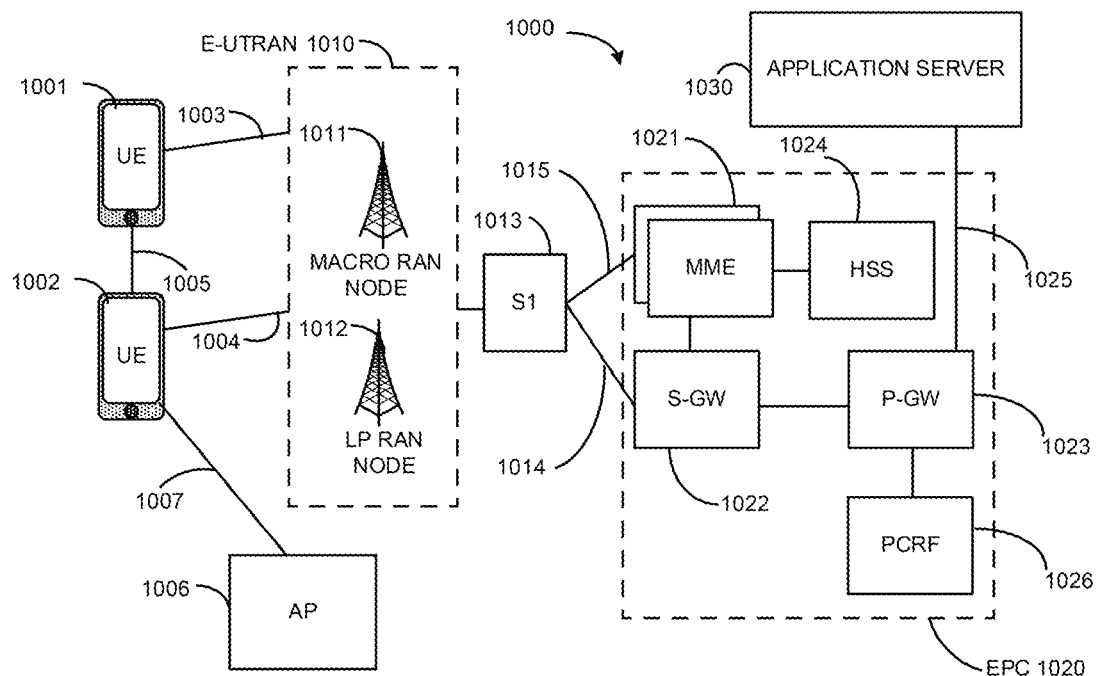
FIG. 10 illustrates an architecture of a system of a network in accordance with some embodiments of the present disclosure.

Embodiments described above and herein may be implemented into a system using any suitable hardware and/or software. FIG. 10 illustrates an architecture of a system 1000 of a network in accordance with some embodiments. The system 1000 is shown to include a User Equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as Machine-to-Machine (M2M) or Machine-Type Communications (MTC) for exchanging data with an MTC server or device via a Public Land Mobile Network (PLMN), Proximity-Based Service (ProSe) or Device-to-Device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a Radio Access Network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an Access Point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These Access Nodes (ANs) can be referred to as Base Stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., Low Power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, Radio Network Controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The Physical Downlink Shared Channel (PDSCH) may carry user data and higher-layer signaling to the UEs 1001 and 1002. The Physical Downlink Control Channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use Control Channel Elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as Resource Element Groups (REGs). Four Quadrature Phase Shift Keying (QPSK) symbols may be mapped to each REG. The PDCCH can be transmitted using one or more CCEs, depending on the size of the Downlink Control Information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an Enhanced Physical Downlink Control Channel (EPDCCH) that uses PDSCH resources for control information transmission. The EPDCCH may be transmitted using one or more Enhanced the Control Channel Elements (ECCEs). Similar to above, each ECCE may correspond to nine sets of four physical resource elements known as an Enhanced Resource Element Groups (EREGs). An ECCE may have other numbers of EREGs in some situations.

The RAN 1010 is shown to be communicatively coupled to a Core Network (CN) 1020—via an S1 interface 1013. In an embodiment, the CN 1020 may be an Evolved Packet Core (EPC) network, a NextGen Packet Core (NPC) network, or some other type of CN. In this embodiment, the S1 interface 1013 is split into two parts: the S1-U interface 1014, which carries traffic data between the RAN nodes 1011 and 1012 and the Serving Gateway (S-GW) 1022, and the S1-mobility Management Entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a Home Subscriber Server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as Application Function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate Traffic Flow Template (TFT) and QoS Class of Identifier (QCI), which commences the QoS and charging as specified by the application server 1030.

Figure 11:
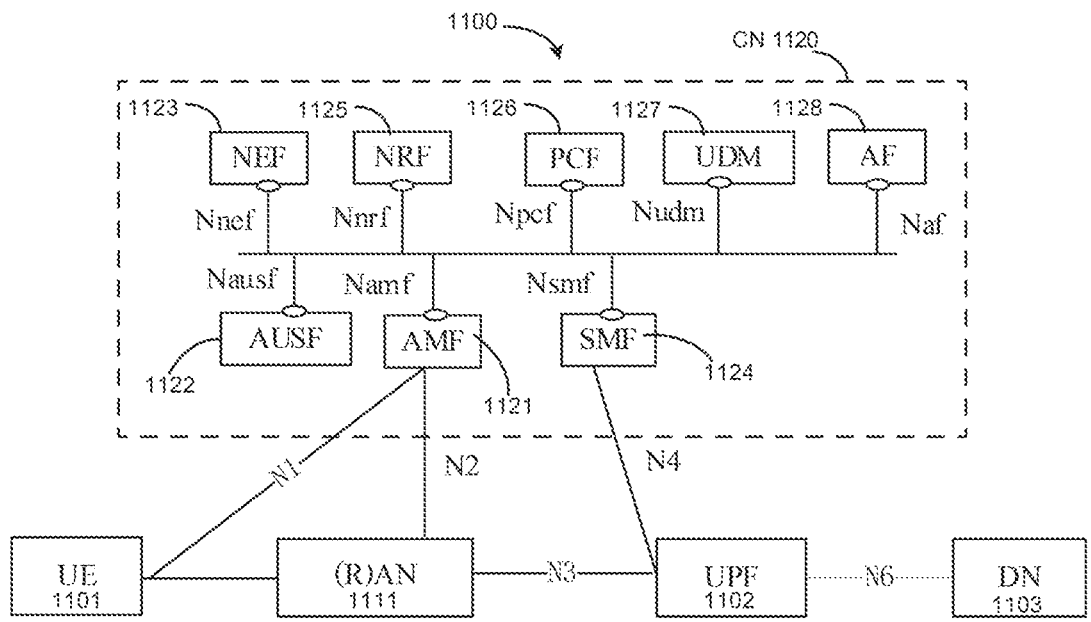
FIG. 11 illustrates an architecture of a system of a network in accordance with some embodiments of the present disclosure

FIG. 11 illustrates an architecture of a system 1100 of a network in accordance with some embodiments. The system 1100 is shown to include a UE 1101, which may be the same or similar to UEs 1001 and 1002 discussed previously; a RAN node 1111, which may be the same or similar to RAN nodes 1011 and 1012 discussed previously; a User Plane Function (UPF) 1102; a Data network (DN) 1103, which may be, for example, operator services, Internet access or 3rd party services; and a 5G Core Network (5GC or CN) 1120.

The CN 1120 may include an Authentication Server Function (AUSF) 1122; a Core Access and Mobility Management Function (AMF) 1121; a Session Management Function (SMF) 1124; a Network Exposure Function (NEF) 1123; a Policy Control function (PCF) 1126; a Network Function (NF) Repository Function (NRF) 1125; a Unified Data Management (UDM) 1127; and an Application Function (AF) 1128. The CN 1120 may also include other elements that are not shown, such as a Structured Data Storage network function (SDSF), an Unstructured Data Storage Network Function (UDSF), and the like.

The UPF 1102 may act as an anchor point for intra-RAT and inter-RAT mobility, an external PDU session point of interconnect to DN 1103, and a branching point to support multi-homed PDU session. The UPF 1102 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1102 may include an uplink classifier to support routing traffic flows to a data network. The DN 1103 may represent various network operator services, Internet access, or third party services. NY 1103 may include, or be similar to application server 1030 discussed previously.

The AUSF 1122 may store data for authentication of UE 1101 and handle authentication related functionality. The AUSF 1122 may facilitate a common authentication framework for various access types.

The AMF 1121 may be responsible for registration management (e.g., for registering UE 1101, etc.), connection management, reachability management, mobility management, and lawful interception of AMF-related events, and access authentication and authorization. AMF 1121 may provide transport for SM messages between and SMF 1124, and act as a transparent proxy for routing SM messages. AMF 1121 may also provide transport for Short Message Service (SMS) messages between UE 1101 and an SMS function (SMSF) (not shown by FIG. 11). AMF 1121 may act as Security Anchor Function (SEA), which may include interaction with the AUSF 1122 and the UE 1101, receipt of an intermediumte key that was established as a result of the UE 1101 authentication process. Where USIM based authentication is used, the AMF 1121 may retrieve the security material from the AUSF 1122. AMF 1121 may also include a Security Context Management (SCM) function, which receives a key from the SEA that it uses to derive access-network specific keys. Furthermore, AMF 1121 may be a termination point of RAN CP interface (N2 reference point), a termination point of NAS (N1) signalling, and perform NAS ciphering and integrity protection.

AMF 1121 may also support NAS signalling with a UE 1101 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 1101 and AMF 1121, and relay uplink and downlink user-plane packets between the UE 1101 and UPF 1102. The N3IWF also provides mechanisms for IPsec tunnel establishment with the UE 1101.

The SMF 1124 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1124 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF 1123 may provide means for securely exposing the services and capabilities provided by 3GPP network functions for third party, internal exposure/re-exposure, Application Functions (e.g., AF 1128), edge computing or fog computing systems, etc. In such embodiments, the NEF 1123 may authenticate, authorize, and/or throttle the AFs. NEF 1123 may also translate information exchanged with the AF 1128 and information exchanged with internal network functions. For example, the NEF 1123 may translate between an AF-Service-Identifier and an internal 5GC information. NEF 1123 may also receive information from other network functions (NFs) based on exposed capabilities of other network functions. This information may be stored at the NEF 1123 as structured data, or at a data storage NF using a standardized interfaces. The stored information can then be re-exposed by the NEF 1123 to other NFs and AFs, and/or used for other purposes such as analytics.

The NRF 1125 may support service discovery functions, receive NF Discovery Requests from NF instances, and provide the information of the discovered NF instances to the NF instances. NRF 1125 also maintains information of available NF instances and their supported services.

The PCF 1126 may provide policy rules to control plane function(s) to enforce them, and may also support unified policy framework to govern network behaviour. The PCF 1126 may also implement a front end (FE) to access subscription information relevant for policy decisions in a UDR of UDM 1127.

The UDM 1127 may handle subscription-related information to support the network entities' handling of communication sessions, and may store subscription data of UE 1101. The UDM 1127 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1126. UDM 1127 may also support SMS management, wherein an SMS-FE implements the similar application logic as discussed previously.

The AF 1128 may provide application influence on traffic routing, access to the Network Capability Exposure (NCE), and interact with the policy framework for policy control. The NCE may be a mechanism that allows the 5GC and AF 1128 to provide information to each other via NEF 1123, which may be used for edge computing implementations. In such implementations, the network operator and third party services may be hosted close to the UE 1101 access point of attachment to achieve an efficient service delivery through the reduced end-to-end latency and load on the transport network. For edge computing implementations, the 5GC may select a UPF 1102 close to the UE 1101 and execute traffic steering from the UPF 1102 to DN 1103 via the N6 interface. This may be based on the UE subscription data, UE location, and information provided by the AF 1128. In this way, the AF 1128 may influence UPF (re)selection and traffic routing. Based on operator deployment, when AF 1128 is considered to be a trusted entity, the network operator may permit AF 1128 to interact directly with relevant NFs.

As discussed previously, the CN 1120 may include an SMSF, which may be responsible for SMS subscription checking and verification, and relaying SM messages to/from the UE 1101 to/from other entities, such as an SMS-GMSC/IWMSC/SMS-router. The SMS may also interact with AMF 1121 and UDM 1127 for notification procedure that the UE 1101 is available for SMS transfer (e.g., set a UE not reachable flag, and notifying UDM 1127 when UE 1101 is available for SMS).

The system 1100 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 1100 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 1120 may include an Nx interface, which is an inter-CN interface between the MME (e.g., MME 1021) and the AMF 1121 in order to enable interworking between CN 1120 and CN 1020.

Although not shown by FIG. 11, system 1100 may include multiple RAN nodes 1111 wherein an Xn interface is defined between two or more RAN nodes 1111 (e.g., gNBs and the like) that connecting to 5GC 1120, between a RAN node 1111 (e.g., gNB) connecting to 5GC 1120 and an eNB (e.g., a RAN node 1011 of FIG. 10), and/or between two eNBs connecting to 5GC 1120.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 12:
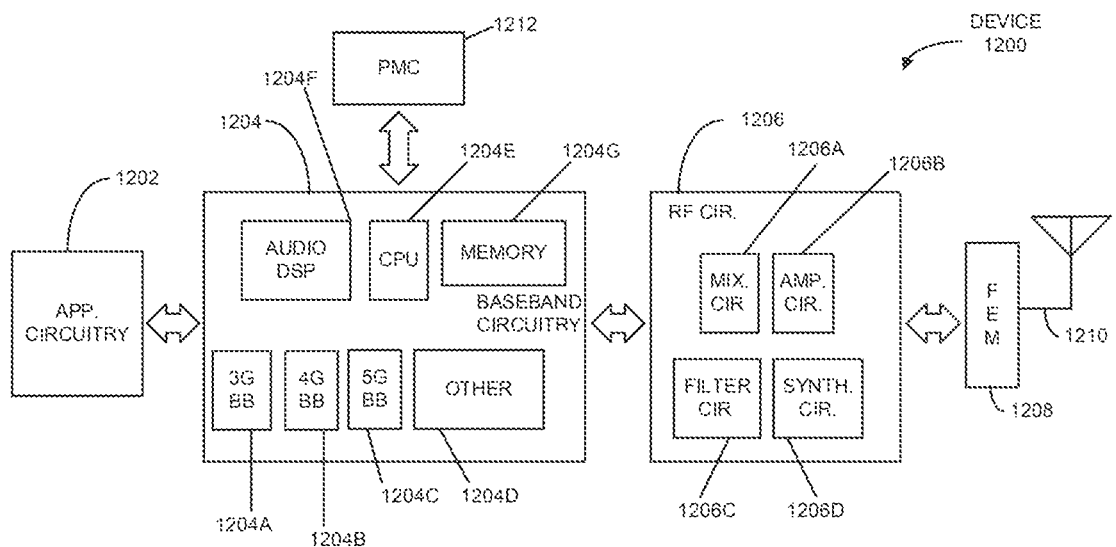
FIG. 12 illustrates exemplary components of a device in accordance with some embodiments of the present disclosure.

FIG. 12 illustrates exemplary components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio Digital Signal Processor(S) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an Evolved Universal Terrestrial Radio Access Network (EUTRAN) or other Wireless Metropolitan Area Networks (WMAN), a Wireless Local Area Network (WLAN), a Wireless Personal Area Network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a Low-Pass Filter (LPF) or Band-Pass Filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include Analog-To-Digital Converter (ADC) and Digital-To-Analog Converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206*d* may be a delta-sigma synthesizer, a frequency multiplier, or a synthesizer comprising a phase-locked loop with a frequency divider.

The synthesizer circuitry 1206*d* may be configured to synthesize an output frequency for use by the mixer circuitry 1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206*d* of the RF circuitry 1206 may include a divider, a Delay-Locked Loop (DLL), a multiplexer and a phase accumulator. In some embodiments, the divider may be a Dual Modulus Divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it transitions back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., Transmission Communication Protocol (TCP) and User Datagram Protocol (UDP) layers). As referred to herein, Layer 3 may comprise a Radio Resource Control (RRC) layer, described in further detail below. As referred to herein, Layer 2 may comprise a Medium Access Control (MAC) layer, a Radio Link Control (RLC) layer, and a Packet Data Convergence Protocol (PDCP) layer, described in further detail below. As referred to herein, Layer 1 may comprise a physical (PHY) layer of a UE/RAN node, described in further detail below.

Figure 13:
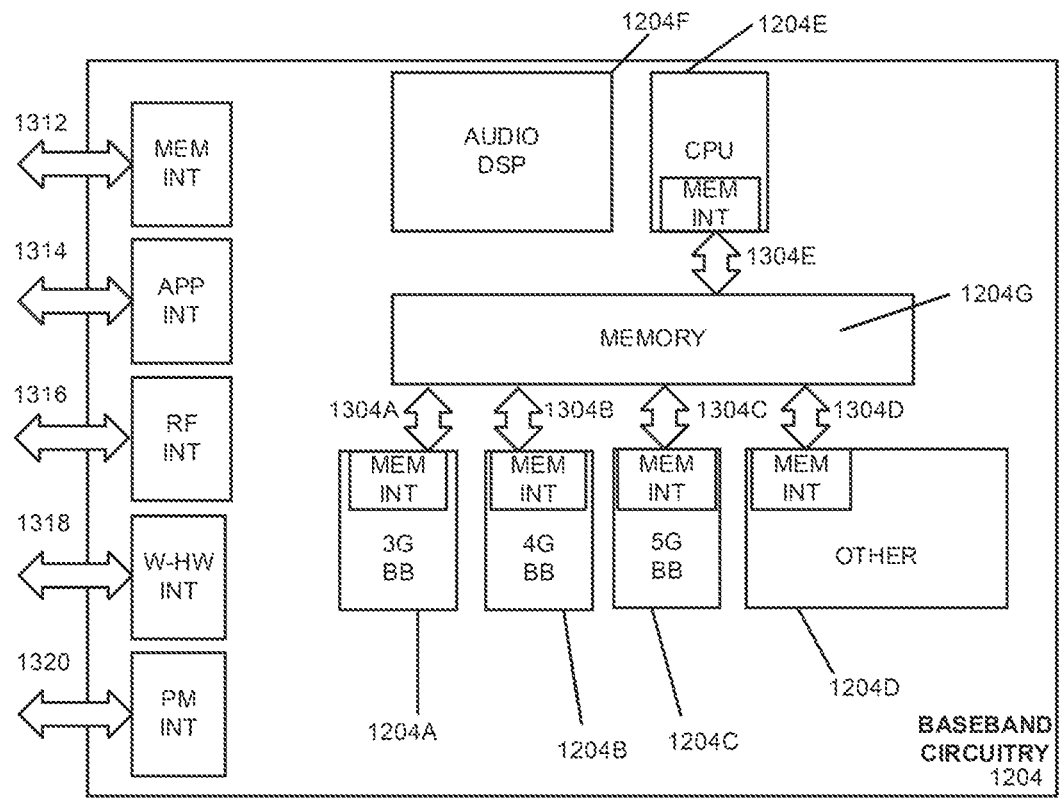
FIG. 13 illustrates exemplary interfaces of baseband circuitry in accordance with some embodiments of the present disclosure.

FIG. 13 illustrates exemplary interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
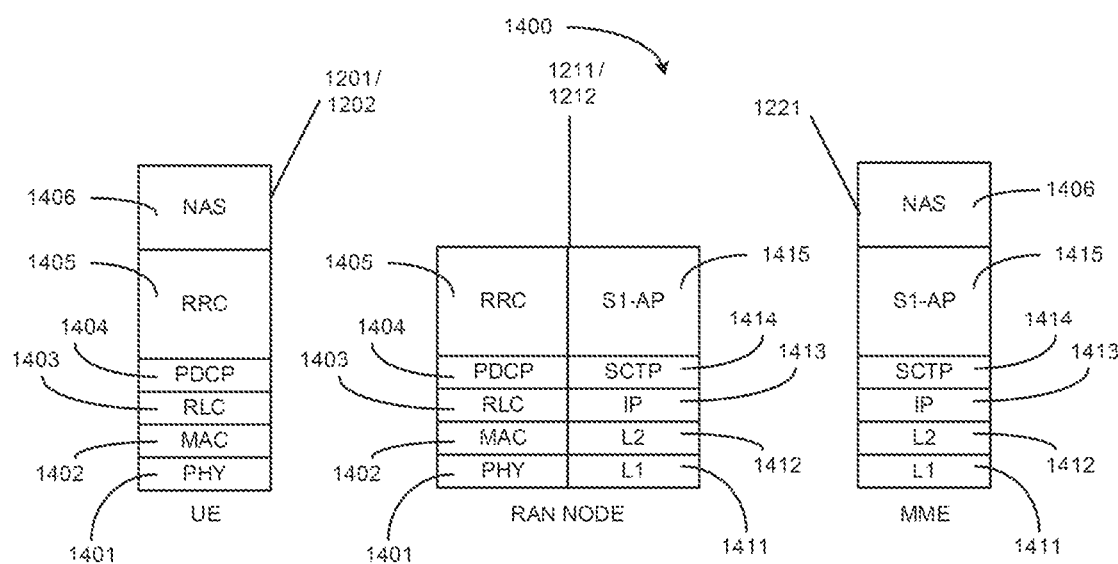
FIG. 14 is an illustration of a control plane protocol stack in accordance with some embodiments of the present disclosure.

FIG. 14 is an illustration of a control plane protocol stack in accordance with some embodiments. In this embodiment, a control plane 1400 is shown as a communications protocol stack between the UE 1001 (or alternatively, the UE 1002), the RAN node 1011 (or alternatively, the RAN node 1012), and the MME 1021.

The PHY layer 1401 may transmit or receive information used by the MAC layer 1402 over one or more air interfaces. The PHY layer 1401 may further perform link adaptation or Adaptive Modulation and Coding (AMC), power control, cell search (e.g., for initial synchronization and handover purposes), and other measurements used by higher layers, such as the RRC layer 1405. The PHY layer 1401 may still further perform error detection on the transport channels, Forward Error Correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC Service Data Units (SDUs) from one or more logical channels onto Transport Blocks (TB) to be delivered to PHY via transport channels, de-multiplexing MAC SDUs to one or more logical channels from Transport Blocks (TB) delivered from the PHY via transport channels, multiplexing MAC SDUs onto TBs, scheduling information reporting, error correction through Hybrid Automatic Repeat Request (HARD), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer Protocol Data Units (PDUs), error correction through Automatic Repeat Request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the Non-Access Stratum (NAS)), broadcast of system information related to the Access Stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter Radio Access Technology (RAT) mobility, and measurement configuration for UE measurement reporting. Said MIBs and SIBs may comprise one or more information elements (IEs), which may each comprise individual data fields or data structures.

The UE 1001 and the RAN node 1011 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The Non-Access Stratum (NAS) protocols 1406 form the highest stratum of the control plane between the UE 1001 and the MME 1021. The NAS protocols 1406 support the mobility of the UE 1001 and the session management procedures to establish and maintain IP connectivity between the UE 1001 and the P-GW 1023.

The S1 Application Protocol (S1-AP) layer 1415 may support the functions of the S1 interface and comprise Elementary Procedures (EPs). An EP is a unit of interaction between the RAN node 1011 and the CN 1020. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 1011 and the MME 1021 based, in part, on the IP protocol, supported by the IP layer 1413. The L2 layer 1412 and the L1 layer 1411 may refer to communication links (e.g., wired or wireless) used by the RAN node and the MME to exchange information.

The RAN node 1011 and the MME 1021 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
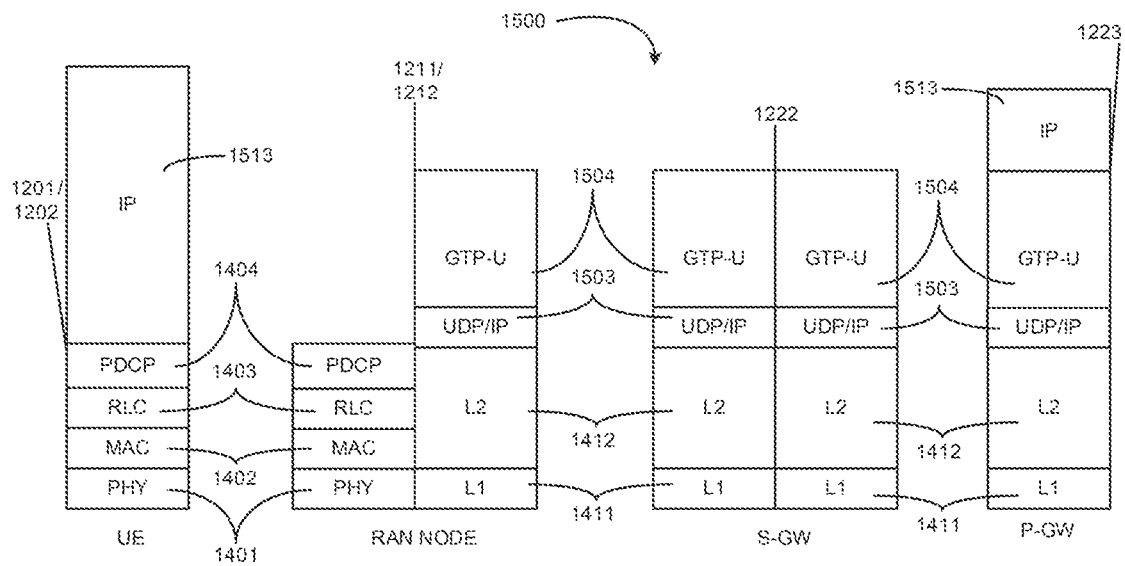
FIG. 15 is an illustration of a user plane protocol stack in accordance with some embodiments of the present disclosure.

FIG. 15 is an illustration of a user plane protocol stack in accordance with some embodiments. In this embodiment, a user plane 1500 is shown as a communications protocol stack between the UE 1001 (or alternatively, the UE 1002), the RAN node 1011 (or alternatively, the RAN node 1012), the S-GW 1022, and the P-GW 1023. The user plane 1500 may utilize at least some of the same protocol layers as the control plane 1400. For example, the UE 1001 and the RAN node 1011 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 1011 and the S-GW 1022 may utilize an S1-U interface to exchange user plane data via a protocol stack comprising the L1 layer 1411, the L2 layer 1412, the UDP/IP layer 1503, and the GTP-U layer 1504. The S-GW 1022 and the P-GW 1023 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 14, NAS protocols support the mobility of the UE 1001 and the session management procedures to establish and maintain IP connectivity between the UE 1001 and the P-GW 1023.

Figure 16:
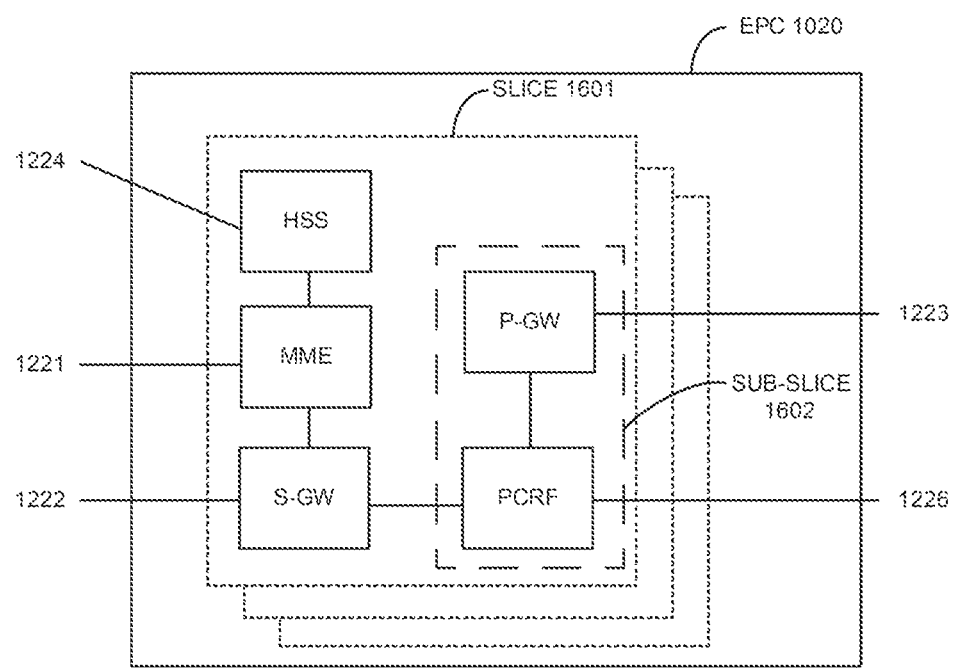
FIG. 16 illustrates components of a core network in accordance with some embodiments of the present disclosure.

FIG. 16 illustrates components of a core network in accordance with some embodiments. The components of the CN 1020 may be implemented in one physical node or separate physical nodes including components to read and execute instructions from a machine-readable or computer-readable medium (e.g., a non-transitory machine-readable storage medium). In embodiments, the components of CN 1120 may be implemented in a same or similar manner as discussed herein with regard to the components of CN 1020. In some embodiments, Network Functions Virtualization (NFV) is utilized to virtualize any or all of the above described network node functions via executable instructions stored in one or more computer readable storage mediums (described in further detail below). A logical instantiation of the CN 1020 may be referred to as a network slice 1601. A logical instantiation of a portion of the CN 1020 may be referred to as a network sub-slice 1602 (e.g., the network sub-slice 1602 is shown to include the PGW 1023 and the PCRF 1026).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 17:
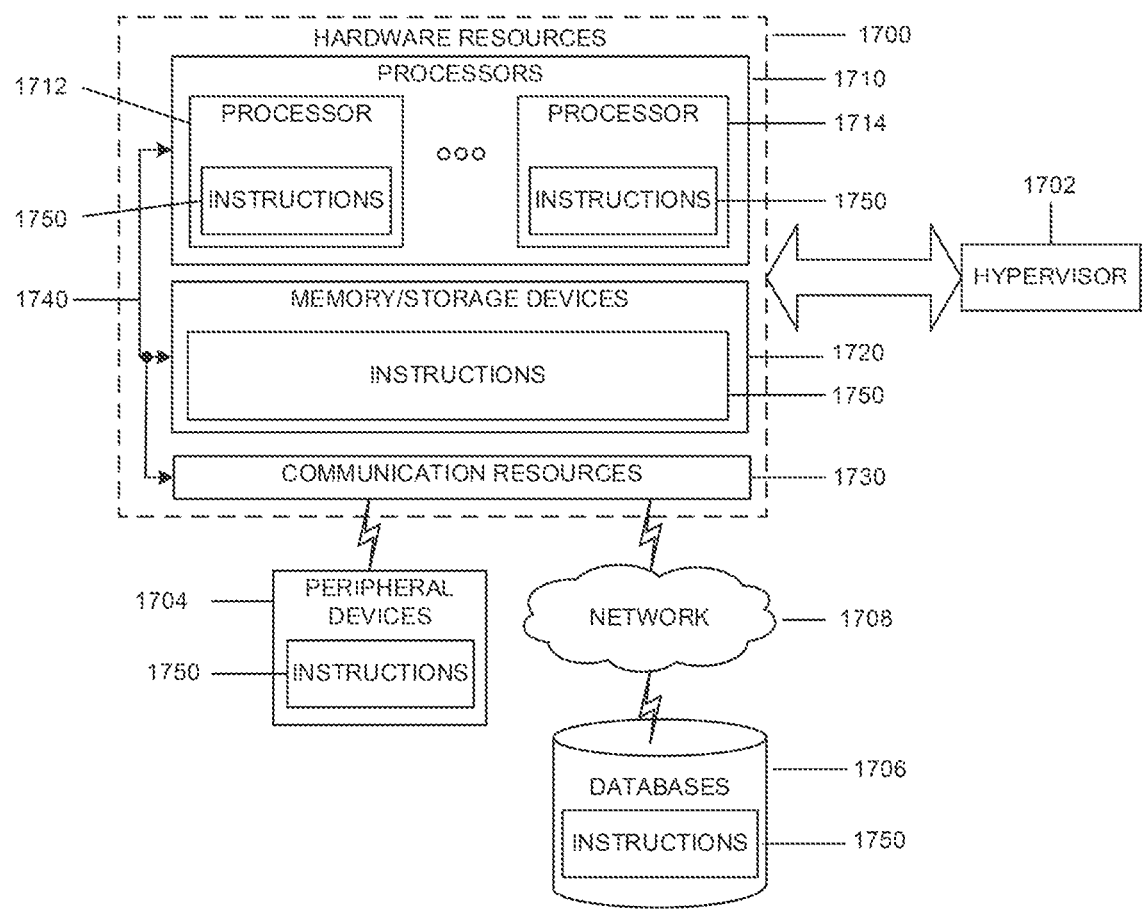
FIG. 17 is a block diagram illustrating components in accordance with some embodiments of the present disclosure.

FIG. 17 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1700 including one or more processors (or processor cores) 1710, one or more memory/storage devices 1720, and one or more communication resources 1730, each of which may be communicatively coupled via a bus 1740. For embodiments where node virtualization (e.g., NFV) is utilized, a hypervisor 1702 may be executed to provide an execution environment for one or more network slices/sub-slices to utilize the hardware resources 1700

The processors 1710 (e.g., a Central Processing Unit (CPU), a Reduced Instruction Set Computing (RISC) processor, a Complex Instruction Set Computing (CISC) processor, a graphics processing unit (GPU), a Digital Signal Processor (DSP) such as a baseband processor, an Application Specific Integrated Circuit (ASIC), a Radio-Frequency Integrated Circuit (RFIC), another processor, or any suitable combination thereof) may include, for example, a processor 1712 and a processor 1714.

The memory/storage devices 1720 may include main memory, disk storage, or any suitable combination thereof. The memory/storage devices 1720 may include, but are not limited to any type of volatile or non-volatile memory such as Dynamic Random Access Memory (DRAM), Static Random-Access Memory (SRAM), Erasable Programmable Read-Only Memory (EPROM), electrically Erasable Programmable Read-Only Memory (EEPROM), Flash memory, solid-state storage, etc.

The communication resources 1730 may include interconnection or network interface components or other suitable devices to communicate with one or more peripheral devices 1704 or one or more databases 1706 via a network 1708. For example, the communication resources 1730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1750 may comprise software, a program, an application, an applet, an app, or other executable code for causing at least any of the processors 1710 to perform any one or more of the methodologies discussed herein. The instructions 1750 may reside, completely or partially, within at least one of the processors 1710 (e.g., within the processor's cache memory), the memory/storage devices 1720, or any suitable combination thereof. Furthermore, any portion of the instructions 1750 may be transferred to the hardware resources 1700 from any combination of the peripheral devices 1704 or the databases 1706. Accordingly, the memory of processors 1710, the memory/storage devices 1720, the peripheral devices 1704, and the databases 1706 are examples of computer-readable and machine-readable medium.

In some embodiments, the electronic device(s), network (s), system(s), chip(s) or component(s), or portions or implementations thereof, of any figure herein may be configured to perform one or more processes, techniques, or methods as described herein, or portions thereof.

EXAMPLES

Example 1 may include an apparatus configured to be employed in a User Equipment (UE), comprising: a Radio Frequency (RF) circuitry interface; and processing circuitry, configured to: perform Channel-State Information (CSI) measurement for communication in unlicensed spectrum; generate data for feedback according to the CSI measurement; and send the data for feedback to RF circuitry via the RF circuitry interface, wherein a frame structure of a data channel for the communication begins with a downlink (DL) transmission or soon after an initial signal, and wherein the CSI measurement includes to measure Channel Quality Information (CQI) for a sub-band (e.g., one or more sub-bands).

Example 2 may include the subject matter of Example 1, wherein the frame structure is a DL-uplink(UL)-DL-UL frame structure.

Example 3 may include the subject matter of Example 1 or 2, wherein a total band for the communication is divided into multiple sub-bands, and wherein the processing circuitry is further configured to measure the CQI for each sub-band.

Example 4 may include the subject matter of any one of Examples 1 to 3, wherein the processing circuitry is further configured to generate data for a hopping sequence for the communication in a pseudo random manner, and wherein a constraint is added to limit the separation in frequency among two adjacent channels.

Example 5 may include the subject matter of Example 2, wherein the DL-UL-DL-UL frame structure includes a frequency tuning period, a Clear Channel Assignment (CCA) and enhanced CCA (eCCA) period, a presence signal period, a DL subframes period, a UL subframes period, a CCA and eCCA period, a DL subframes period and a UL subframes period in sequence.

Example 6 may include the subject matter of Example 1, wherein the frame structure is a DL-UL frame structure.

Example 7 may include the subject matter of any one of Examples 1, 3 and 6, wherein the processing circuitry is further configured to: perform long term measurement of the CQI on a specific sub-band based on continuous DL transmissions over the specific sub-band, and generate data for periodic feedback as for reporting mode 1-0, where the periodicity is to be configured through Radio Resource Control (RRC) or Downlink Control Information (DCI) signaling.

Example 8 may include the subject matter of any one of Examples 1, 3, 6 and 7, wherein the processing circuitry is further configured to generate the CQI for all sub-bands or only the CQI related to a specific sub-band periodically.

Example 9 may include the subject matter of Example any one of Examples 1, 3 and 6 to 8, wherein the number of sub-bands is fixed or predefined or is flexibly changed through higher layer signaling.

Example 10 may include the subject matter of any one of Examples 1, 3 and 6 to 8, wherein periodic reporting mode 3-0 or 3-1 is to be reused, or periodic mode 2-0 and/or 2-1 is to be used where the M sub-bands are selected based on a whitelist.

Example 11 may include the subject matter of Example 1 or 6, wherein the processing circuitry is further configured to compute the CQI based on the measurement of a previous DL transmission occurred over an adjacent channel in a previous hop.

Example 12 may include the subject matter of Example 1 or 6, wherein active channels for the communication having high correlation are to be chosen by an eNB.

Example 13 may include the subject matter of Example 1, wherein the CQI is reported as wideband CQI.

Example 14 may include the subject matter of Example 1, wherein the CQI includes wideband CQI and sub-band CQI, and the sub-band CQI is 2 bit differential field based on the wideband CQI.

Example 15 may include the subject matter of Example 1, wherein the processing circuitry is configured to compute the CQI as follows: a total bandwidth constructed by the channels in a whitelist; a total bandwidth of multiple adjacent channels; and a total bandwidth of a specific channel.

Example 16 may include the subject matter of Example 1, wherein the processing circuitry is further configured to evaluate the CQI according to a UE preferred channel index or Resource Blocks (RBs).

Example 17 may include the subject matter of Example 1 or 16, wherein the processing circuitry is further configured to evaluate sub-band CQI as follows: the CQI based on one specific channel; and the CQI on selected RBs within the one specific channel.

Example 18 may include the subject matter of Example 1, wherein the CQI is reported aperiodically.

Example 19 may include the subject matter of any one of Examples 1 to 18, wherein the communication is enhanced Machine Type Communication (eMTC).

Example 20 may include the subject matter of any one of Examples 1 to 19, wherein the Rank Indicator (RI) is not reported, and the rank is fixed to 1.

Example 21 may include the subject matter of any one of Examples 1 to 19, wherein only the CQI is reported in the feedback and mode x-2 and x-3 are not supported.

Example 22 may include the subject matter of Example 1 or 19, wherein the feedback contains a wideband CQI and a wideband Precoder Matrix Indicator (PMI).

Example 23 may include the subject matter of Example 1 or 19, wherein frequency-selective CQI is supported.

Example 24 may include the subject matter of Example 1 or 19, wherein mode 2-1 and/or 3-1 is supported.

Example 25 may include the subject matter of any one of Examples 1, 13 and 19, wherein only mode 1-1 is supported, which includes a wideband CQI, and a single PMI on the wideband CQI.

Example 26 may include the subject matter of any one of Examples 1, 13 and 19, wherein mode 1-1 is supported with other reporting modalities.

Example 27 may include the subject matter of any one of Examples 1, 13 and 19, wherein only mode 2-0 is supported as the legacy eMTC systems or in conjunction with other modalities, e.g., mode 1-0 and/or mode 1-1.

Example 28 may include the subject matter of any one of Examples 1, 13 and 19, wherein mode 2-1 is supported.

Example 29 may include the subject matter of any one of Examples 1, 13 and 19, wherein an offset may be contained within the DCI that triggers the CQI measurement.

Example 30 may include the subject matter of Example 1 or 19, wherein the sub-bands are RRC configured.

Example 31 may include the subject matter of Example 1 or 19, wherein the configuration of the sub-bands is encoded within the bitmap which indicates the list of available channels.

Example 32 may include a computer-readable medium (e.g., a non-transitory computer-readable medium) comprising instructions that, when executed (e.g., by one or more processors of an electronic device), cause an electronic device to: perform a Channel-State Information (CSI) measurement and feedback procedure for communication in unlicensed spectrum, wherein the CSI measurement and feedback procedure is over a frame structure of a data channel, wherein the frame structure is a DL-UL frame structure including a frequency tuning period, a CCA and eCCA period, a presence signal period, a DL subframes period and a UL subframes period in sequence, wherein a total band for the communication is divided into multiple sub-bands, and wherein the processing circuitry is further configured to measure the CQI for each sub-band.

Example 33 may include a computer-readable medium (e.g., a non-transitory computer-readable medium) comprising instructions that, when executed (e.g., by one or more processors of an electronic device), cause an electronic device to: perform the Channel-State Information (CSI) measurement and feedback procedure for communication in unlicensed spectrum described above.

Example 34 may include a method comprising the Channel-State Information (CSI) measurement and feedback procedure for communication in unlicensed spectrum described above.

Example 35 may include a computer-readable medium (e.g., a non-transitory computer-readable medium) comprising instructions that, when executed (e.g., by one or more processors of an electronic device), cause an electronic device to: generate a Sounding Reference Signal (SRS) for uplink (UL) channel estimation for communication in unlicensed spectrum, wherein the communication is over a frame structure of a data dwell time comprising a downlink (DL) dwell time and a UL dwell time, wherein a DL transmission in the DL dwell time is to trigger transmission of the SRS within an available UL dwell time.

Example 36 may include the subject matter of Example 35, wherein Long Term Evolution (LTE) signal generation mechanisms are reused.

Example 37 may include the subject matter of Example 35 or 36, wherein the communication for the SRS is to use 6 Resource Blocks (RBs) within a data hop, and the SRS is generated to have a comb-like structure within the 6 RBs.

Example 38 may include the subject matter of any one of Examples 35 to 37, wherein the SRS is to occupy all tones across the 6 RBs using different Cyclic Delay Diversity (CDD) or Orthogonal Cover Codes (OCCs).

Example 39 may include the subject matter of any one of Examples 35 to 38, wherein the instructions, when executed, cause the electronic device to: generate SRS transmission hopping for the SRS in a carrier-specific manner; generate hopping patterns for the SRS transmission hops based on a data hopping pattern; and determine the data hopping pattern based on a function of a Physical Cell Identity (PCI) and System Frame Number (SFN)+eFrame number.

Example 40 may include the subject matter of any one of Examples 35 to 39, wherein the frame structure comprises a DL-UL sequence or DL-UL-DL-UL sequence.

Example 41 may include the subject matter of any one of Examples 35 to 39, wherein a total band over which SRS transmissions in the communication are to hop is divided over multiple sub-bands, and wherein the SRS transmissions are for all sub-bands on a periodic basis or are over a specific sub-band configured through higher layer signaling comprising Radio Resource Control (RRC) signaling or Non-Access Stratum (NAS) signaling.

Example 42 may include the subject matter of any one of Examples 35 to 39, wherein the instructions, when executed, cause the electronic device to: detect a configuration via higher layer signaling, wherein the higher layer signaling comprises RRC signaling or NAS signaling; determine or identify, based on the configuration, a number of sub-bands and/or a number of times on which SRS transmissions are to be performed over a specific sub-band before the SRS is transmitted on a different band; and determine or identify a bandwidth of the sub-band.

Example 43 may include the subject matter of any one of Examples 35 to 39, wherein the instructions, when executed, cause the electronic device to: generate a hopping sequence such that channels have a specific separation in frequency among two adjacent channels and/or the channels are sufficiently correlated, wherein the SRS is to be communicated on a periodic basis or on an aperiodic basis.

Example 44 may include the subject matter of any one of Examples 35 to 38, wherein in the communication, the SRS is transmitted in a Physical Resource Block (PRB) fashion that is performed through an entire 6 PRBs through hopping in a frequency domain such that a sequence of SRS transmissions jointly spans a frequency range of interest.

Example 45 may include the subject matter of any one of Examples 35 to 44, wherein in the communication, the SRS is transmitted upon activation of the SRS and without regard to a DL Clear Channel Assessment (CCA)/enhanced CCA (eCCA).

Example 46 may include the subject matter of any one of Examples 35 to 45, wherein SRS opportunities including the periodic SRS opportunities are associated with a data dwell time, and wherein an SRS opportunity is automatically disabled at an end of an available data dwell time even when a periodic SRS transmission is activated.

Example 47 may include the subject matter of any one of Examples 35 to 39, wherein a sub-band configuration for the SRS is a same configuration or a different configuration as a sub-band configuration for Channel State Information (CSI)-Reference Signal (RS) for DL channel measurement.

Example 48 may include the subject matter of any one of Examples 35 to 39, wherein a number of sub-bands and/or a number of times on which SRS transmissions are to be performed over a specific sub-band before the SRS is transmitted on a different band is predefined, and wherein a bandwidth of the sub-band is predefined.

Example 49 may include the subject matter of any one of Examples 35 to 39, wherein the instructions, when executed, cause the electronic device to: detect a configuration via higher layer signaling, wherein the higher layer signaling comprises RRC signaling or NAS signaling; and determine or identify, based on the configuration, a periodicity for transmitting the SRS, and wherein periodic SRS transmission is for a long term channel state estimate on a specific sub-band based on continuous SRS transmissions over the specific sub-band.

Example 50 may include the subject matter of any one of Examples 35 to 39, wherein in the communication, the transmission of the SRS for a sub-band is by way of a wideband SRS transmission that allows for sounding of an entire frequency range of interest with the transmission of the SRS.

Example 51 may include the subject matter of any one of Examples 35 to 39, wherein in the communication, the transmission of the SRS is over a narrowband transmission that is hopping in a frequency domain such that a sequence of the SRS jointly spans a range of interest in a long run.

Example 52 may include the subject matter of any one of Examples 35 to 39, wherein: the signal generation includes generating a Demodulation Reference Signal (DM-RS) to be used to estimate channel information; and in the communication, the DM-RS is transmitted over a Physical Uplink Shared Channel (PUSCH).

Example 53 may include the subject matter of any one of Examples 35 to 39, wherein the electronic device is implemented in or by an enhanced Machine Type Communication (eMTC) User Equipment (UE).

Example 54 may include a method comprising the SRS transmission and/or channel-state estimation for communication in unlicensed spectrum as described above.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A User Equipment (UE), comprising:
a Radio Frequency (RF) circuitry interface; and
processing circuitry, configured to:
perform a Channel-State Information (CSI) measurement for communication in an unlicensed spectrum;
generate data for feedback according to the CSI measurement; and
send the data for feedback to RF circuitry via the RF circuitry interface, wherein a frame structure of a data channel for the communication begins with a frequency tuning period, followed by a presence signal period, followed by a downlink (DL) transmission, wherein the frame structure is a DL-uplink (UL)-DL-UL frame structure; and
wherein the CSI measurement includes a Channel Quality Information (CQI) for a sub-band.

2. The UE of claim 1, wherein a total band for the communication is divided into multiple sub-bands, and wherein the processing circuitry is further configured to measure the CQI for each sub-band.

3. The UE of claim 1, wherein the processing circuitry is further configured to generate data for a hopping sequence for the communication in a pseudo random manner, and wherein a constraint is added to limit a separation in frequency among two adjacent channels.

4. The UE of claim 1, wherein the DL-UL-DL-UL frame structure further includes a Clear Channel Assignment (CCA) and enhanced CCA (eCCA) period, the presence signal period, a DL subframes period, a UL subframes period, a CCA and eCCA period, a DL subframes period and a UL subframes period in sequence.

5. The UE of claim 1, wherein the processing circuitry is further configured to: perform long term measurement of the CQI on a specific sub-band based on continuous DL transmissions over the specific sub-band; and generate data for periodic feedback with a periodicity as for reporting mode 1-0, where the periodicity is to be configured through Radio Resource Control (RRC) or Downlink Control Information (DCI) signaling.

6. The UE of claim 1, wherein the processing circuitry is further configured to generate the CQI for all sub-bands or only the CQI related to a specific sub-band periodically.

7. The UE of claim 1, wherein a number of sub-bands is fixed or predefined or is flexibly changed through higher layer signaling.

8. The UE of claim 7, wherein periodic reporting mode 3-0 or 3-1 is to be reused, or periodic mode 2-0 and/or 2-1 is to be used where the number of sub-bands are selected based on a list.

9. The UE of claim 1, wherein the processing circuitry is further configured to compute the CQI based on a measurement of a previous DL transmission occurred over an adjacent channel in a previous hop.

10. The UE of claim 1, wherein active channels for the communication having high correlation are to be chosen by a base station.

11. The UE of claim 1, wherein the CQI is reported as a wideband CQI.

12. The UE of claim 1, wherein the CQI includes a wideband CQI and a sub-band CQI, and the sub-band CQI is 2 bit differential field based on the wideband CQI.

13. The UE of claim 1, wherein the processing circuitry is configured to compute the CQI as follows:
a total bandwidth constructed by channels in a list;
a total bandwidth of multiple adjacent channels; and
a total bandwidth of a specific channel.

14. The UE of claim 1, wherein the processing circuitry is further configured to evaluate the CQI according to a UE preferred channel index or Resource Blocks (RBs).

15. The UE of claim 1, wherein the processing circuitry is further configured to evaluate the sub-band CQI as follows:
the CQI based on one specific channel; and
the CQI on selected RBs within the one specific channel.

16. The UE of claim 1, wherein the CQI is reported aperiodically.

17. The UE of claim 1, wherein the communication is an enhanced Machine Type Communication (eMTC).

18. One or more non-transitory, computer-readable media comprising instructions that, when executed, cause an electronic device to:
perform a Channel-State Information (CSI) measurement and feedback procedure for communication in an unlicensed spectrum,
wherein the CSI measurement and feedback procedure is over a frame structure of a data channel,
wherein the frame structure is a downlink-uplink (DL-UL) frame structure including a frequency tuning period, a CCA and eCCA period, a presence signal period, followed by a DL subframes period and a UL subframes period in sequence,
wherein a total band for the communication is divided into multiple sub-bands, and wherein the processing circuitry is further configured to measure a Channel Quality Information (CQI) for each sub-band.

* * * * *